United States Patent [19]
Minagawa et al.

[11] Patent Number: 4,499,220
[45] Date of Patent: Feb. 12, 1985

[54] COPOLYMER LIGHT STABILIZERS HAVING AT LEAST ONE 2,2,6,6-TETRAALKYL PIPERIDYL GROUP AND SYNTHETIC RESIN COMPOSITIONS CONTAINING THE SAME

[75] Inventors: Motonobu Minagawa, Kosigaya City; Naohiro Kubota, Ageo City; Toshihiro Shibata, Omiya City, all of Japan

[73] Assignee: Adeka Argus Chemical Co., Ltd., Urawa, Japan

[21] Appl. No.: 379,847

[22] Filed: May 20, 1982

[30] Foreign Application Priority Data

Jul. 3, 1981 [JP] Japan .................... 56-104069

[51] Int. Cl.$^3$ .................... C08K 5/15; C08K 5/45; C08F 8/00; C08F 222/22
[52] U.S. Cl. .................... 524/102; 524/326; 524/336; 524/342; 524/395; 525/203; 525/327.6; 525/375; 526/263; 546/19; 546/190
[58] Field of Search ............... 524/86, 87, 99, 102, 524/110, 111, 114, 326, 336, 345, 342; 525/327.6, 203, 375; 526/265; 546/242, 190, 19

[56] References Cited

U.S. PATENT DOCUMENTS 4,308,362 12/1981 Niezer et al. .................. 525/327.6
4,311,820 1/1982 Nikles .................. 546/292

Primary Examiner—John Kight
Assistant Examiner—Kriellion Morgan

[57] ABSTRACT

Copolymer light stabilizers are provided having at least one 2,2,6,6-tetraalkyl piperidyl group in the molecule and a molecular weight within the range from about 1000 to about 20,000, that are copolymers of a maleic or fumaric acid ester containing a 2,2,6,6-tetraalkyl piperidyl group in the alcohol group of the formula:

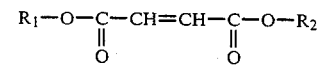

wherein

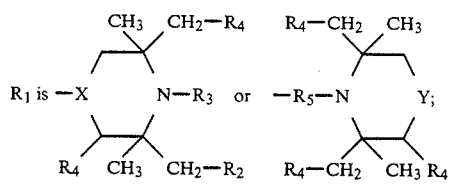

$R_2$ is alkyl or $R_1$;
X is

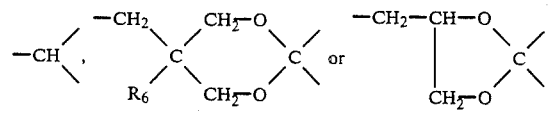

$R_6$ is lower alkyl;
$R_3$ is hydrogen or alkyl;
$R_4$ is hydrogen or methyl;
$R_5$ is alkylene;
Y is

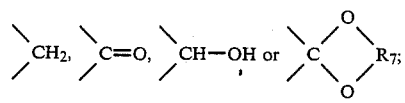

$R_7$ is alkylene;
and at least one monomer selected from the group consisting of aliphatic carboxylic acid vinyl ester having from two to eight carbon atoms; alkyl vinyl ethers having from one to eighteen carbon atoms; triallyl isocyanurate; pinene; and tricyclo-(5.2.1.0$^{2.6}$)-decene-3; and synthetic resin compositions having improved light stability comprising per 100 parts by weight of resin from 0.001 to 5 parts by weight of the polymeric light stabilizer.

32 Claims, No Drawings

COPOLYMER LIGHT STABILIZERS HAVING AT LEAST ONE 2,2,6,6-TETRAALKYL PIPERIDYL GROUP AND SYNTHETIC RESIN COMPOSITIONS CONTAINING THE SAME

Many synthetic polymers such as polyethylene, polypropylene, ABS resin, polyvinyl chloride, and polyurethanes undergo degradation with a resulting deterioration in physical properties, such as discoloration and a loss of mechanical strength, upon exposure to light.

Consequently, a variety of light stabilizers have been proposed to inhibit such deterioration. However, the available light stabilizers are unsatisfactory, some being destroyed by heat and oxidation, others being extracted by water or organic solvents, and some imparting color to the polymers.

2,2,6,6-Tetraalkyl piperidine compounds do not impart color to the polymer, and act as quenchers. However, the available piperidine compounds are unsatisfactory in stabilizing effectiveness, are so volatile that they are lost when the polymer is heated at elevated temperatures, and are extracted by water.

2,2,6,6-Tetraalkyl piperidine compounds of high molecular weight are said to have improved properties in these respects. Several types of polymers have been described.

U.S. Pat. No. 3,705,166, patented Dec. 5, 1972, to Murayama and Morimura, provide acrylic acid derivatives having the Formulae I and II:

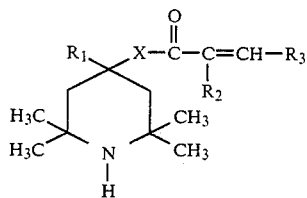

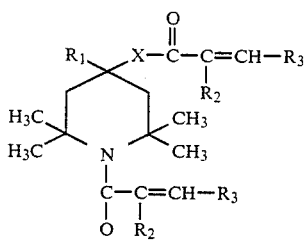

wherein
$R_1$ represents hydrogen atom or cyano group;
$R_2$ and $R_3$ may be the same or different and each represents hydrogen atom or methyl group; and
X represents imino group or oxygen atom.

They are as such useful as a stabilizer for the photo- and thermal-deterioration of various synthetic polymers, e.g., polyolefins, polyvinyl chloride, polyamides, polyurethanes and the like. They may be also subjected to a graft-copolymerization with other polymers or to a copolymerization with the monomer of said polymer to form a wide variety of polymeric substances having an excellent light stability.

U.S. Pat. No. 4,210,612, patented July 1, 1980 to Karrer indicates that these acrylic acid derivatives are too readily volatile. While the possibility of incorporating the monomeric additive in certain substrates is pointed out, this has the disadvantage that the polymer structure is destroyed by the additive incorporated and this can lead to a change, which is difficult to regulate, in the characteristics of the substrate to be protected.

Karrer provides homopolymeric and copolymeric additives which, in addition to excellent light-stabilizing properties, have good solubility or compatibility in the polymer and a high stability to extraction.

The homopolymeric compounds carry N-heterocyclic rings in a side position and have the recurring structural unit of the Formula I

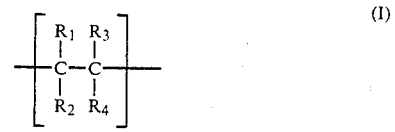

in which $R_1$ is a group containing an N-heterocyclic ring, of the formulae II, III, IV and V:

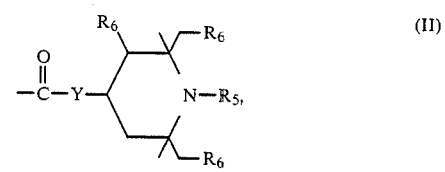

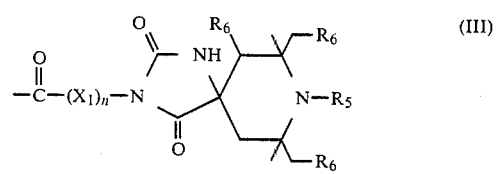

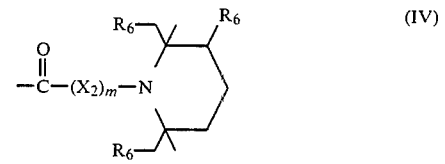

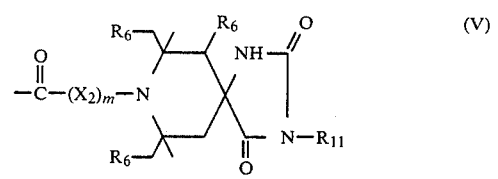

U.S. Pat. No. 4,294,949 to Karrer, patented Oct. 13, 1981, also provides homopolymeric acrylates and methacrylates which carry N-heterocyclic rings in a side position and their copolymers with compounds containing at least one polymerizable double bond.

U.S. Pat. No. 4,233,412 to Rody et al, patented Nov. 11, 1980, provides condensation polymers and addition polymers, the recurrent molecular unit of which contains a polyalkylpiperidine radical of the formula:

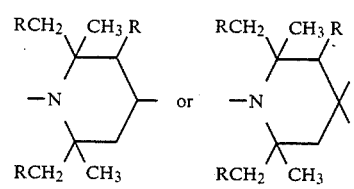

or which are substituted by a polyalkylpiperidine side group of the formula:

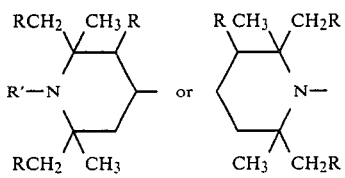

in which R denotes hydrogen or alkyl with one to five carbon atoms and R' denotes hydrogen, alkyl with one to twelve carbon atoms, alkenyl with three to eight carbon atoms, alkynyl with three to six carbon atoms, aralkyl with seven to twelve carbon atoms, alkanoyl with one to eight carbon atoms, or alkenoyl with three to five carbon atoms, and copolymers with one another or with polyalkylpiperidine-free components.

Examples of such polymers are polyesters, polyethers, polyamides, polyamines, polyurethanes, polyureas, polysulphides, polysulphones, polyimides, polysulphonates, polyphosphates, polyphosphonates, polysilyl esters, polysiloxanes, polyhydrazides, polyhydrazenes or polybenzimidazoles.

Hindered piperidyl (meth)acrylate polymers are also disclosed in Japan Kokai No. 71185/79, and hindered piperidyl maleate/α-olefin copolymers are disclosed in Japan Kokai No. 157612/80.

The volatility of these compounds is low, but their stabilizing effectiveness is unsatisfactory.

In accordance with the present invention, copolymer light stabilizers are provided having at least one 2,2,6,6-tetraalkyl piperidyl group in the molecule and a molecular weight within the range from about 1000 to about 20,000, that are copolymers of a maleic or fumaric acid ester containing a 2,2,6,6-tetraalkyl piperidyl group in the alcohol group of the formula:

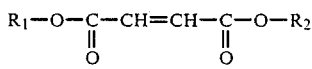

wherein

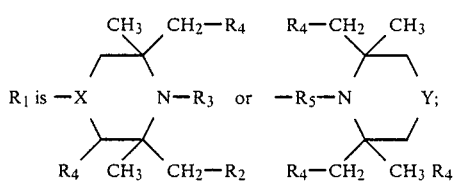

$R_2$ is alkyl having from one to about eighteen carbon atoms or $R_1$;
X is

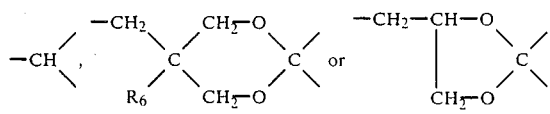

$R_6$ is lower alkyl or hydroxyalkyl having from one to about four carbon atoms;
$R_3$ is hydrogen; alkaryl having from seven to ten carbon atoms; or alkyl, hydroxyalkyl or epoxyalkyl having from one to about eighteen carbon atoms;

$R_4$ is hydrogen or methyl;
$R_5$ is alkylene having from two to about four carbon atoms;
Y is

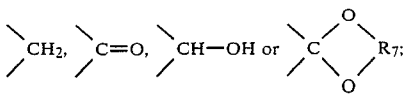

$R_7$ is alkylene having from two to about eighteen carbon atoms;
and at least one monomer selected from the group consisting of aliphatic carboxylic acid vinyl esters having from two to about eight carbon atoms; alkyl vinyl ethers having from one to about eighteen carbon atoms; triallyl isocyanurate; pinene; and tricyclo $(5.2.1.0^{2.6})$-decene-3.

Synthetic resin compositions having improved light stability are also provided comprising per 100 parts by weight of resin from 0.001 to 5 parts by weight of the polymeric light stabilizer.

The maleic and fumaric acid esters are esters of any of maleic or fumaric acid with a 2,2,6,6-tetraalkyl piperidyl alcohol represented by one of the formulae (I) and (II):

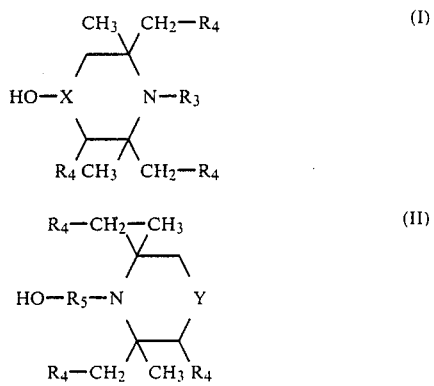

wherein:
X is selected from the group consisting of —CH;

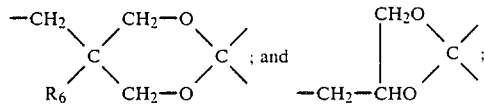

$R_6$ is lower alkyl or hydroxy alkyl having from one to about four carbon atoms;
$R_4$ is hydrogen or methyl;
$R_3$ is hydrogen; alkyl, hydroxyalkyl and epoxy alkyl having from one to about eighteen carbon atoms; or aralkyl having from seven to about ten carbon atoms;
Y is selected from the group consisting of $>CH_2$; $>CHOH$; $>C=O$; and

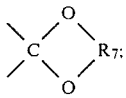

R₇ is alkylene having from two to about eighteen carbon atoms; and

R₅ is alkylene having from two to about four carbon atoms.

Exemplary $R_2$ alkyl are methyl, ethyl, propyl, isopropyl, butyl, hexyl, octyl, isooctyl, 2-ethylhexyl, decyl, dodecyl, tridecyl, tetradecyl, hexadecyl and octadecyl.

Exemplary $R_3$ alkyl are methyl, ethyl, propyl, isopropyl, butyl, hexyl, octyl, isooctyl, 2-ethylhexyl, decyl, dodecyl, tridecyl, tetradecyl, hexadecyl and octadecyl; aralkyl is benzyl; hydroxyalkyl are 2-hydroxyethyl, 2-hydroxypropyl, 2-hydroxybutyl, and epoxyalkyl is 2,3-epoxypropyl.

Exemplary $R_5$ alkylene are ethylene, 1,2-propylene and 1,2-butylene.

Exemplary $R_6$ lower alkyl and hydroxyalkyl are methyl, hydroxymethyl, ethyl, propyl and butyl.

Exemplary $R_7$ alkylene are ethylene, 1,2-propylene, 1,3-propylene, 2,2-dimethyl propylene, 1,2-butylene, 1,2-hexylene, 1,2-octylene, 1,2-decylene, 1,2-dodecylene, 1,2-tetradecylene, 1,2-hexadecylene, 1,2-octadecylene, 2-methyl-2-hydroxymethyl propylene and 2-ethyl-2-hydroxymethyl propylene.

2,2,6,6-Tetraalkyl piperidyl alcohols represented by formulae (I) and (II) are as follows:

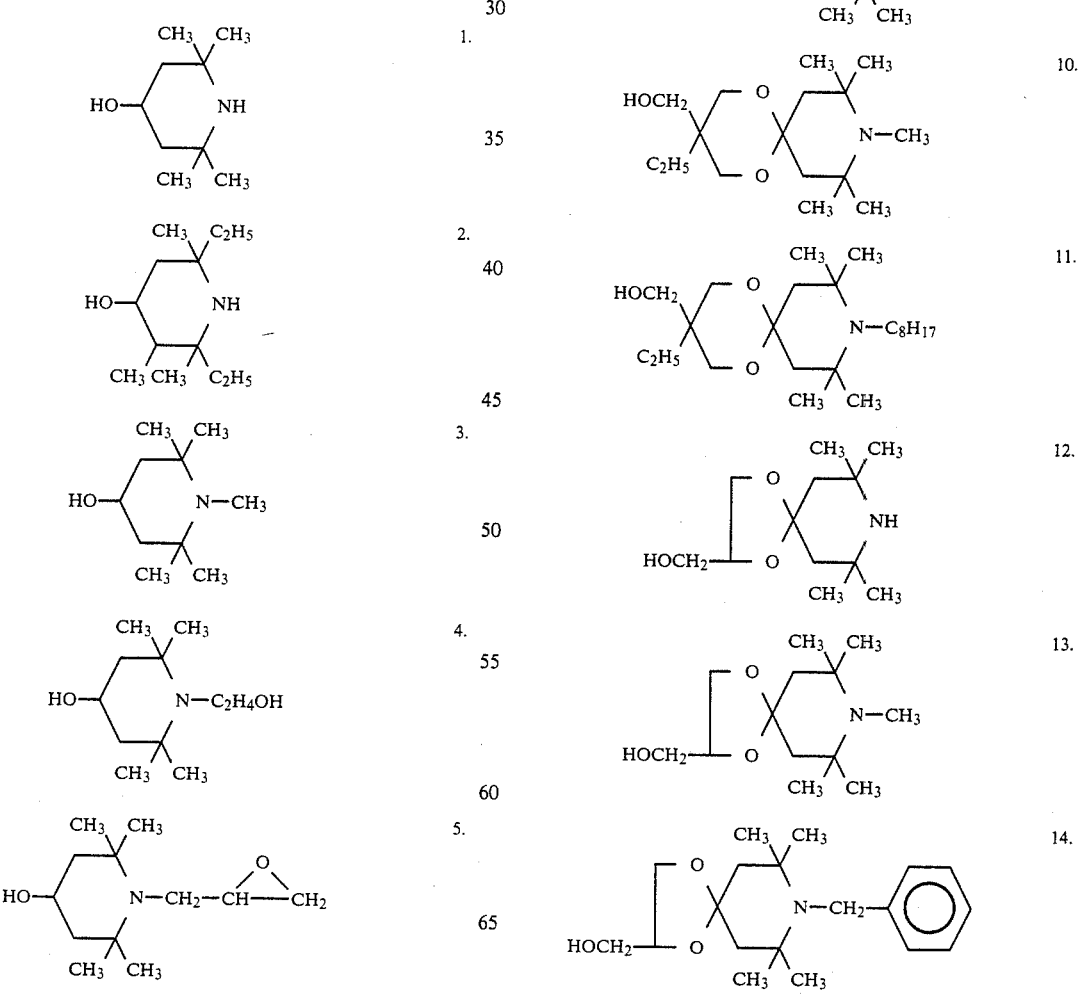

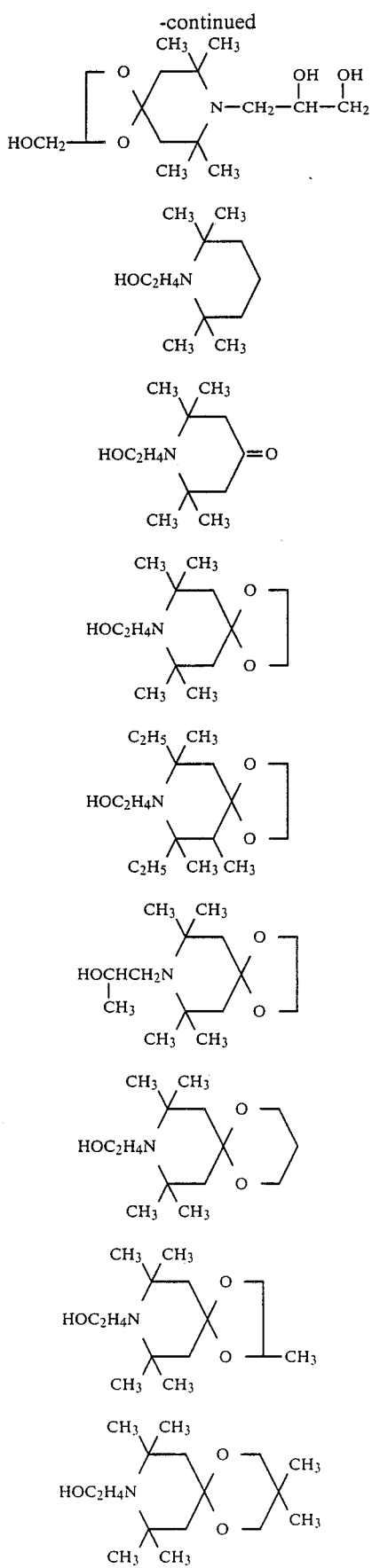
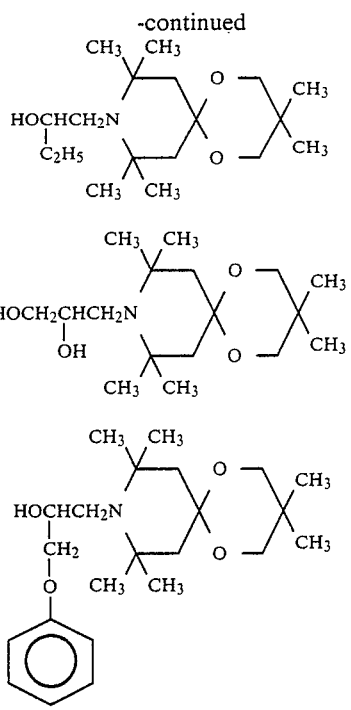

Exemplary monomers which are aliphatic carboxylic acid vinyl esters are vinyl acetate, vinyl propionate, vinyl butyrate, vinyl caproate, vinyl caprylate and vinyl 2-ethylhexanoate.

Exemplary monomers which are alkyl vinyl ethers are methyl vinyl ether, ethyl vinyl ether, propyl vinyl ether, butyl vinyl ether, isopropyl vinyl ether, isobutyl vinyl ether, amyl vinyl ether, hexyl vinyl ether and 2-ethylhexyl vinyl ether.

The polymeric light stabilizers of this invention can be prepared by polymerizing the maleic or fumaric acid ester with the copolymerizable unsaturated monomer in the presence of a polymerization initiator or catalyst, such as an organic peroxide or organic azonitrile. They can also be prepared by transesterifying the polymer of the maleic or fumaric acid ester with the piperidyl compound represented by formula (I) or (II).

In forming copolymers, the molar ratio of unsaturated carboxylic acid to other unsaturated monomers may be within the range from 10:0 to 1:10, preferably from 5:1 to 1:5.

The following Examples illustrate the procedure.

EXAMPLE I

Preparation of bis(1,2,2,6,6-pentamethyl-4-piperidyl)fumarate/vinyl acetate copolymer Bis(1,2,2,6,6-pentamethyl-4-piperidyl)fumarate 2.1 g, vinyl acetate 1.7 g and dicumylperoxide 0.03 g were dissolved in 5 ml of toluene and stirred at 120° C. for five hours. The solvent and unreacted vinyl acetate were distilled off and a glassy solid was obtained. (Stabilizer No. I)

M.W. = 1500
Softening point 68° to 75° C.
N content = 5.2%

EXAMPLE II

Preparation of
bis(3-ethyl-8,8,9,10,10-pentamethyl-9-aza-1,5-dioxaspiro(5,5)-3-undecylmethyl)fumarate/vinyl acetate copolymer Bis(3-ethyl-8,8,9,10,10-pentamethyl-9-aza-1,5-dioxaspiro(5,5)-3-undecylmethyl)fumarate 2.8 g, vinyl acetate 1.4 g, azobisisobutyronitrile 0.042 g and benzene 5 ml were stirred at 75° C. for 3.5 hours. The solvent was distilled off and a pale yellow glassy solid was obtained. (Stabilizer No. II)
M.W.=2800
Softening point 83° to 89° C.
N content=3.6%

EXAMPLE III

Preparation of
bis(1,2,2,6,6-pentamethyl-4-piperidyl)fumarate/butyl vinyl ether copolymer Bis(1,2,2,6,6-pentamethyl-4-piperidyl)fumarate 2.1 g, butyl vinyl ether 0.47 g, dicumyl peroxide 0.026 g and toluene 5 ml were stirred at 110° C. for ten hours. The solvent was distilled off and a glassy solid was obtained. (Stabilizer No. III)
M.W.=2000
Softening point 80° C.
N content=5.8%

EXAMPLE IV

Preparation of
bis(1,2,2,6,6-pentamethyl-4-piperidyl)fumarate/tricyclo(5.2.1.0$^{2.6}$)decene-3 copolymer Bis(1,2,2,6,6-pentamethyl-4-piperidyl)fumarate 2.1 g, tricyclo(5.2.1.0$^{2.6}$)decene-3 0.66 g, dicumylperoxide 0.03 g and toluene 5 ml were stirred at 110° C. for nine hours. Then, the dicumyl peroxide 0.03 g was added and stirred at 110° C. for additional ten hours. The solvent was distilled off and a glassy solid was obtained. (Stabilizer No. IV)
M.W.=1800
Softening point 73° to 79° C.
N content=5.4%

EXAMPLE V

Preparation of
bis(1,2,2,6,6-pentamethyl-4-piperidyl)fumarate/triallyl isocyanurate copolymer Bis(1,2,2,6,6-pentamethyl-4-piperidyl)fumarate 2.1 g, triallyl isocyanurate 1.7 g and dicumyl peroxide 0.024 g were stirred at 130° C. for one hour. A glassy solid of softening point 170° C. was obtained. (Stabilizer No. V)
M.W.=3200
Softening point 170° C.
N content=11.2%

The stabilizers prepared by this procedure are shown in Table I below.

TABLE I

| Stabilizer No. | Maleic (fumaric) acid ester | Monomer | Molar ratio | M.W. | N content (%) |
|---|---|---|---|---|---|
| I | [structure: bis(1,2,2,6,6-pentamethyl-4-piperidyl) fumarate] | Vinyl acetate | 1:4 | 1500 | 5.2 |
| II | [structure: bis(3-ethyl-8,8,9,10,10-pentamethyl-9-aza-1,5-dioxaspiro(5,5)-3-undecylmethyl) fumarate unit] | Vinyl acetate | 1:4 | 2800 | 3.6 |
| III | [structure: bis(1,2,2,6,6-pentamethyl-4-piperidyl) fumarate] | Butyl vinyl ether | 1:1 | 2000 | 5.8 |
| IV | [structure: bis(1,2,2,6,6-pentamethyl-4-piperidyl) fumarate] | Tricyclo (5.2.1.0$^{2.6}$) decene-3 | 1:1 | 1800 | 5.4 |

TABLE I-continued

| Stabilizer No. | Maleic (fumaric) acid ester | Monomer | Molar ratio | M.W. | N content (%) |
|---|---|---|---|---|---|
| V | piperidine-CH₃/CH₃ with HN, ring bearing –OCCH=CHCO– linking to second 2,2,6,6-tetramethylpiperidine with NH | Triallyl isocyanurate | 3:4 | 3200 | 11.2 |
| VI | bis(1,2,2,6,6-pentamethylpiperidin-4-yl) maleate (CH₃N substituents) –OCCH=CHCO– | Vinyl propionate | 1:2 | 1800 | 4.8 |
| VII | bis(2,2,6,6-tetramethylpiperidin-4-yl) maleate (HN) –OCCH=CHCO– | Butyl vinyl ether | 1:1 | 2000 | 5.3 |
| VIII | [1,2,2,6,6-pentamethylpiperidine spiro-dioxane with C₂H₅ and CH₂OC(O)–CH= ]₂ | Octyl vinyl ether | 1:1 | 2500 | 3.6 |
| IX | [1,2,2,6,6-pentamethylpiperidine spiro-dioxane with C₂H₅ and CH₂OC(O)–CH= ]₂ | dicyclopentadiene | 1:3 | 3100 | 3.3 |
| X | [1,2,2,6,6-pentamethylpiperidine spiro-dioxane –CH₂OCCH= ]₂ | Vinyl acetate | 2:1 | 2700 | 4.5 |
| XI | [1,2,2,6,6-pentamethylpiperidine spiro-dioxane –CH₂OCCH= ]₂ | Butyl vinyl ether | 3:2 | 2300 | 4.4 |
| XII | [2,2,6,6-tetraethyl/dimethyl piperidine N–C₂H₄OCCH= ]₂ | Vinyl acetate | 1:2 | 1600 | 4.1 |

TABLE I-continued

| Stabilizer No. | Maleic (fumaric) acid ester | Monomer | Molar ratio | M.W. | N content (%) |
|---|---|---|---|---|---|
| XIII | (structure) | Vinyl acetate | 2:1 | 2700 | 4.0 |
| XIV | (structure) | (dicyclopentadiene structure) | 1:2 | 2000 | 3.4 |
| XV | (structure) | Vinyl acetate | 1:1 | 2500 | 4.2 |
| XVI | (structure) | Butyl vinyl ether | 1:1 | 2200 | 4.2 |
| XVII | (structure) | α-Pinene | 1:2 | 2000 | 5.7 |

Small amounts of the stabilizer of this invention when combined with synthetic resin improve the light stability of the resin. The amount of the stabilizer is generally within the range from about 0.001 to about 5 parts by weight, preferably from about 0.01 to about 3 parts by weight, per 100 parts by weight of resin.

Synthetic resins that can have their resistance to deterioration enhanced with the polymeric stabilizer compound according to this invention include α-olefin polymers such as polyethylene, polypropylene, polybutene, poly-3-methylbutene, on mixtures thereof and with copolymers other monomers such as ethylene-vinyl acetate copolymer; ethylene-propylene copolymer; polystyrene; polyvinyl acetate; polyacrylic esters; copolymers from styrene and another monomer (for example, maleic anhydride, butadiene, and acrylonitrile); acrylonitrile-butadiene-styrene copolymer, acrylic acid ester-butadiene-styrene copolymer, methacrylic acid ester-butadiene-styrene copolymer, polymethacrylate esters such as polymethacrylate; polyvinyl alcohol; polyvinyl formal; polyvinyl butyral; linear polyesters, polyamides; polycarbonates; polyacetals; polyurethanes; cellulosic resins; phenol-formaldehyde resins; urea-formaldehyde resins; melamine-formaldehyde resins; epoxy resins; unsaturated polyester resins; silicone resins; halogen-containing resins such as polyvinyl chloride, polyvinylidene chloride, polyvinylidene fluoride, and copolymers thereof, and rubbers such as isoprene rubber, butadiene rubber, epichlorohydrin rubber, chloroprene rubber, and blends of any of the above.

The polymeric 2,2,6,6-tetraalkyl piperidyl stabilizers of the invention can be combined with conventional heat stabilizers such as phenolic antioxidants, polyvalent metal salts of organic acids, organic phosphites, thioethers, and other known heat stabilizers, thereby constituting light and heat stabilizer compositions of the invention.

The phenolic antioxidant contains one or more phenolic hydroxyl groups, and one or more phenolic nuclei, and can contain from about eight to about three hundred carbon atoms. In addition, the phenolic nucleus can contain an oxy or thio ether group.

The alkyl-substituted phenols and polynuclear phenols, because of their molecular weight, have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in an alkyl, alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one. In the case of bicyclic phenols, the rings can be linked by thio or oxyether groups, or by alkylene, alicyclidene or arylidene groups.

The monocyclic phenols which can be employed have the structure:

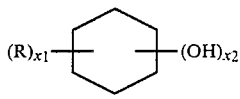

R is selected from the group consisting of hydrogen; halogen; and organic radicals containing from one to about thirty carbon atoms, such as alkyl, aryl, alkenyl, alkaryl, aralkyl, cycloalkenyl, cycloalkyl, alkoxy, and acyl

where R' is aryl, alkyl or cycloalkyl.

$X_1$ and $X_2$ are integers from one to four, and the sum of $x_1$ and $x_2$ does not exceed six.

The polycyclic phenol phenol is one having at least two aromatic nuclei linked by a polyvalent linking radical, as defined by the formula:

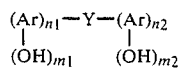

wherein

Y is a polyvalent linking group selected from the group consisting of oxygen; carbonyl; sulfur; sulfinyl; aromatic, aliphatic and cycloaliphatic hydrocarbon groups; and oxyhydrocarbon, thiohydrocarbon and heterocyclic groups. The linking group can have from one up to twenty carbon atoms.

Ar is a phenolic nucleus which can be a phenyl or a polycarbocyclic group having condensed or separate phenyl rings; each Ar group contains at least one free phenolic hydroxyl group up to a total of five. The Ar rings can also include additional rings connected by additional linking nuclei of the type Y, for example, Ar—Y—Ar—Y—Ar.

$m_1$ and $m_2$ are numbers from one to five, and $n_1$ and $n_2$ are numbers of one or greater, and preferably from one to four.

The aromatic nucleus Ar can, in addition to phenolic hydroxyl groups, include one or more inert substituents. Examples of such inert substituents include hydrogen, halogen atoms, e.g., chlorine, bromine and fluorine; organic radicals containing from one to about thirty carbon atoms, such as alkyl, aryl, alkaryl, aralkyl, cycloalkenyl, cycloalkyl, alkoxy, aryloxy and acyloxy

where R' is aryl, alkyl or cycloalkyl, or thiohydrocarbon groups having from one to about thirty carbon atoms, and carboxyl

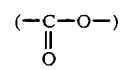

groups. Usually, however, each aromatic nucleus will not have more than about eighteen carbon atoms in any hydrocarbon substituent group. The Ar group can have from one to four substituent groups per nucleus.

Typical aromatic nuclei include phenyl, naphthyl, phenanthryl, triphenylenyl, anthracenyl, pyrenyl, chrysenyl, and fluoroenyl groups.

When Ar is a benzene nucleus, the polyhydric polycyclic phenol has the structure:

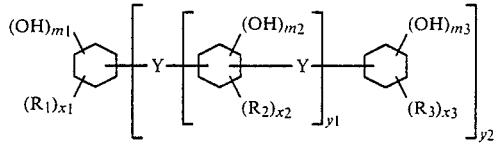

wherein $R_1$, $R_2$ and $R_3$ are inert substituent groups as described in the previous paragraph;

$m_1$ and $m_3$ are integers from one to a maximum of five;

$m_2$ is an integer from one to a maximum of four;

$x_1$ and $x_3$ are integers from zero to four, and $x_2$ is an integer from zero to three;

$y_1$ is an integer from zero to about six and $y_2$ is an integer from one to five, preferably one or two.

Preferably, the hydroxyl groups are located ortho and/or para to Y.

Exemplary Y groups are alkylene, alkylidene, and alkenylene; arylene, alkyl arylene, arylalkylene; cycloalkylene, cycloalkylidene; and oxa- and thia-substituted such groups; tetrahydrofuranes, esters and triazino groups. The Y groups are usually bi, tri, or tetravalent, connecting two, three or four Ar groups. However, higher valency Y groups connecting more than four Ar groups, can also be used. According to their constitution, the Y groups can be assigned to subgenera as follows:

(1) Y groups where at least one carbon in a chain or cyclic arrangement connect the aromatic groups, such as:

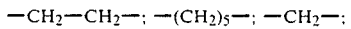

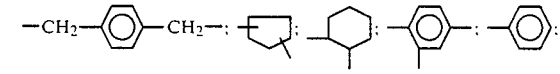

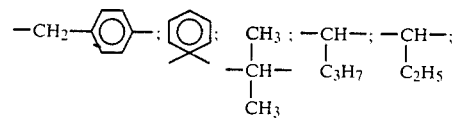
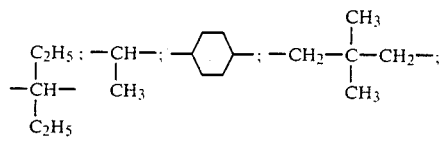
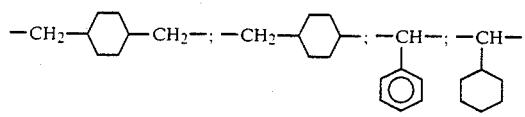
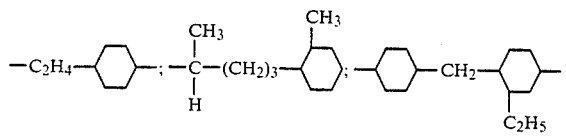
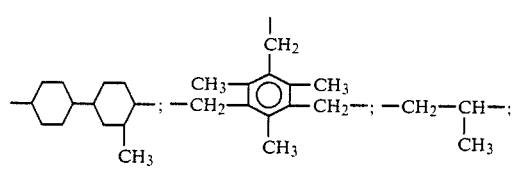
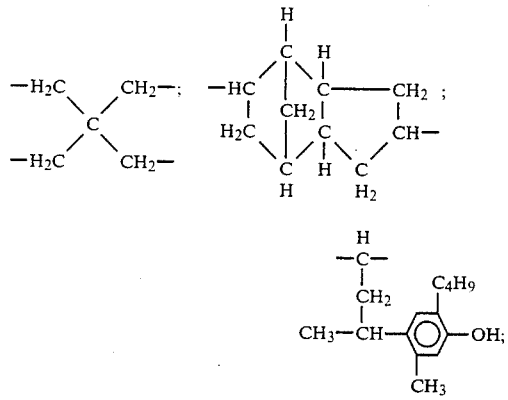
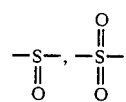

(2) Y groups where only atoms other than carbon link the aromatic rings, such as —O—, —S—,

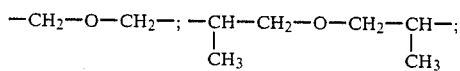

and —(S)$_x$— where x is a number from one to ten;

(3) Y groups made up of more than a single atom including both carbon and other atoms linking the aromatic nuclei, such as:

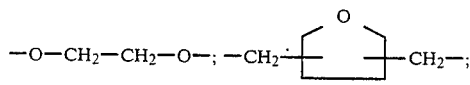

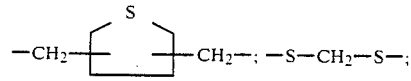
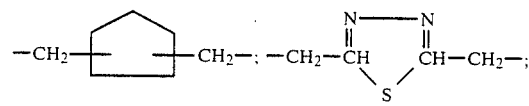
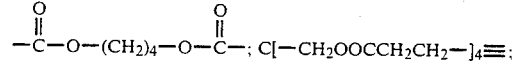
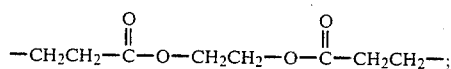
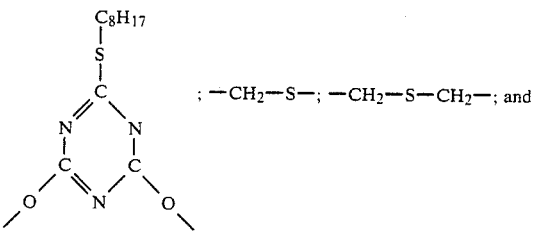

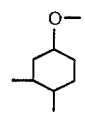

Although the relation of effectiveness to chemical structure is insufficiently understood, many of the most effective phenols have Y groups of subgenus (1), and accordingly this is preferred. Some of these phenols can be prepared by the alkylation of phenols or alkyl phenols with polyunsaturated hydrocarbons such as dicyclopentadiene or butadiene.

Representative phenols include guaiacol, resorcinol monoacetate, vanillin, butyl salicylate, 2,6-di-tert-butyl-4-methyl phenol, 2-tert-butyl-4-methoxy phenol, 2,4-dinonyl phenol, 2,3,4,5-tetradecyl phenol, tetrahydro-α-naphthol, o-, m- and p-cresol, o-, m- and p-phenylphenol, o-, m- and p-xylenols, the carvenols, symmetrical xylenol, thymol, o-, m- and p-nonylphenol, o-, m- and p-dodecyl-phenol, and o-, m- and p-octyl-phenyl, o-, and m-tert-butyl-p-hydroxy-anisole, p-n-decyloxyphenol, p-n-decyloxy-cresol, nonyl-n-decyloxy-cresol, eugenol, isoeugenol, glyceryl monosalicylate, methyl-p-hydroxy-cinnamate, 4-benzyloxy-phenol, p-acetylaminophenol, p-stearyl-aminophenol, methyl-p-hydroxybenzoate, p-dichlorobenzoyl-aminophenol, p-hydroxysalicyl anilide, stearyl-(3,5-di-methyl-4-hydroxy-benzyl)thioglycolate, stearyl-β-(4-hydroxy-3,5-di-t-butylphenyl)propionate, distearyl-3,5-di-t-butyl-4-hydroxybenzylphosphonate, and distearyl (4-hydroxy-3-methyl-5-t-butyl)benzylmalonate.

Exemplary polyhydric phenols are orcinol, propyl gallate, catechol, resorcinol, 4-octyl-resorcinol, 4-dodecylresorcinol, 4-octadecyl-catechol, 4-isooctyl-phloroglucinol, pyrogallol, hexahydroxybenzene, 4-isohexylcatechol, 2,6-di-tertiary-butyl-resorcinol, 2,6-di-isopropyl-phloroglucinol.

Exemplary polyhydric polycyclic phenols are methylene bis-(2,6-di-tertiary-butyl-phenol), 2,2-bis-(4-hydroxy phenyl)propane, methylene-bis-(p-cresol), 4,4'- benzylidene bis(2-tertiary-butyl-5-methyl-phenol), 4,4'-cyclo-hexylidene bis-(2-tertiary-butylphenol), 2,2'-methylene-bis-(4-methyl-6-(1'-methyl-cyclohexyl)-phenol), 2,6-bis-(2'-hydroxy-3'-tertiary-butyl-5'-methyl-benzyl)-4-methylphenol, 4,4'-bis-(2-tertiary-butyl-5-methyl-phenol), 2,2'-bis-(4-hydroxy-phenyl)butane, ethylene bis-(p-cresol), 4,4'-oxobis-phenol, 4,4'-oxobis-(3-methyl-5-isopropyl-phenol), 4,4'-oxobis-(3-methyl-phenol), 2,2'-oxobis-(4-dodecyl-phenol), 2,2'-oxobis-(4-methyl-5-tertiary-butyl-phenyl), 4,4'-thio-bis-phenol; 4,4'-thio-bis-(3-methyl-6-tertiary-butyl-phenol), 2,2'-thio-bis-(4-methyl-6-tertiary-butyl-phenol), 4,4'-n-butylidene-(2-t-butyl-5-methyl-phenol), 2,2'-methylene-bis-(4-methyl-6-(1'-methyl-cyclohexyl)-phenol), 4,4'-cyclohexylene bis-(2-tertiary-butyl-phenol), 2,6-bis-(2'-hydroxy-3'-t-butyl-5'-methyl-benzyl)-4-methyl-phenol, hydroxybenzyl)-naphthalene, 2,2'-(2-butene)-bis-(4-methoxy-6-tert-butylphenol)-bis-[3,3-bis-(4-hydroxy-3-t-butylphenyl)butyric acid] glycol ester, 4,4'-butylidene-bis-(6-t-butyl-m-cresol), 1,1,3-tris-(2-methyl-4-hydroxy-5-t-butylphenyl)butane, 1,3,5-tris-(3,5-di-t-butyl-4-hydroxybenzyl)-2,4,6-trimethylbenzene, tetrakis [methylene-3(3,5-di-t-butyl-4-hydroxyphenyl)propionate] methane, 1,3,5-tris-(3,5-di-t-butyl-4-hydroxybenzyl)isocyanurate, 1,3,5-tris-(3,5-di-t-butyl-4-hydroxyphenyl)propionyl-oxyethyl isocyanurate, 2-octylthio-4,6-di-(4-hydroxy-3,5-di-t-butyl)phenoxy-1,3,5-triazine, 4,4'-thiobis-(6-t-butyl-m-cresol) and pentaerythritol hydroxyphenyl propionate.

A particularly desirable class of polyhydric polycyclic phenols are the dicyclopentadiene polyphenols, which are of the type:

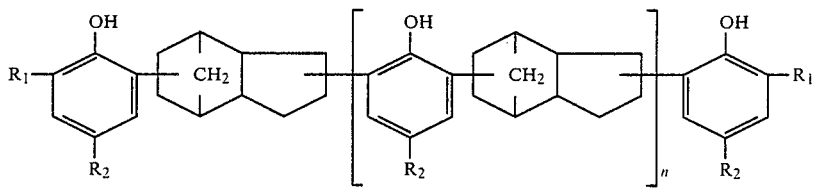

in which $R_1$ and $R_2$ are lower alkyl, and can be the same or different, and n is the number of the groups enclosed by the brackets, and is usually from 1 to about 5. These are described in U.S. Pat. No. 3,567,683, dated Mar. 2, 1971 to Spacht. A commercially available member of this class is Wingstay L, exemplified by dicyclopentadiene tri-(2-tert-butyl-4-methyl-phenol) of the formula:

4,4'-oxobis(naphthalene-1,5-diol), 1,3'-bis-(naphthalene-2,5-diol)propane, and 2,2'-butylene bis-(naphthalene-2,7-diol), (3-methyl-5-tert-butyl-4-hydroxyphenyl)-4'-hydroxy-phenyl)propane, 2,2'-methylene-bis-(4-methyl-5-isopropylphenol), 2,2'-methylene-bis-(4-methyl-5-isopropylphenol), 2,2'-methylene-bis-(5-tert-butyl-4-chlorophenol), (3,5-di-tert-butyl-4-hydroxyphenyl)-(4'-hydroxyphenyl)ethane, (2-hydroxy-phenyl)-(3',5'-di-tert-butyl-4',4-hydroxyphenyl)ethane, 2,2'-methylene-bis-(4-octylphenol), 4,4'-propylene-bis-(2-tert-butylphenol), 2,2'-isobutylene-bis-(4-nonylphenol), 2,4-bis-(4-hydroxy-3-t-butyl-phenoxy)-6-(n-octylthio)-1,3,5-triazine, 2,4,6-tris-(4-hydroxy-3-t-butyl-phenoxy)-1,3,5-triazine, 2,2'-bis-(3-t-butyl-4-hydroxyphenyl) thiazolo-(5,4-d)thiazole, 2,2'-bis-(3-methyl-5-t-butyl-4-hydroxyphenyl)thiazolo-(5,4-d)-thiazole, 4,4'-bis-(4-hydroxyphenyl)pentanoic acid octadecyl ester, cyclopentylene-4,4'-bis-phenol, 2-ethylbutylene-4,4'-bisphenol, 4,4'-cyclooctylene-bis-(2-cyclohexylphenol), β,β-thiodiethanolbis-(3-tert-butyl-4-hydroxyphenoxy acetate), 1,4-butanediobis-(3-tert-butyl-4-hydroxyphenoxy acetate), pentaerythritol tetra-(4-hydroxyphenol propionate), 2,4,4'-tri-hydroxy benzophenone, bis-(2-tert-butyl-3-hydroxy-5-methylphenyl) sulfide, bis-(2-tert-butyl-4-hydroxy-5-methylphenyl)sulfide, bis-(2-tert-butyl-4-hydroxy-5-methylphenyl)sulfoxide, bis-(3-ethyl-5-tert-butyl-4-hydroxybenzyl)sulfide, bis-(2-hydroxy-4-methyl-6-tert-butyl-phenyl)sulfide, 4,4'-bis-(4-hydroxyphenol)pentanoic acid octadecyl thiopropionate ester, 1,1,3-tris-(2'-methyl-4-hydroxy-5'-tert-butylphenyl)butane, 1,1,3-tris-(1-methyl-3-hydroxy-4-tert-butylphenyl)butane, 1,8-bis-(2-hydroxy-5-methylbenzoyl-n-octane, 2,2'-ethylenebis-[4'-(3-tert-butyl-4-hydroxyphenyl)-thiazole], 1-methyl-3-(3-methyl-5-tert-butyl-4-

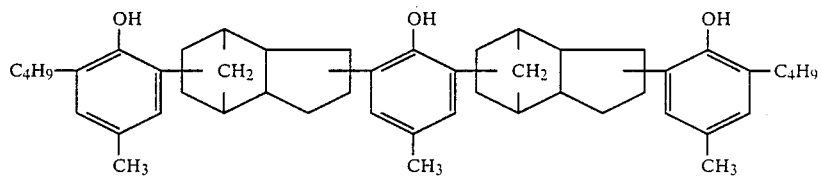

The polyhydric polycyclic phenols used in the invention can also be condensation products of phenols or alkylphenols with hydrocarbons having a bicyclic ring structure and a double bond or two or more double bonds, such as α-pinene, β-pinene, dipentene, limonene, vinylcyclohexene, dicyclopentadiene, allo-ocimene, isoprene and butadiene. These condensation products are usually obtained under acidic conditions in the form of more or less complex mixtures of monomeric and polymeric compounds. However, it is usually not necessary to isolate the individual constituents. The entire reaction product, merely freed from the acidic condensation catalyst and unchanged starting material, can be used with excellent results. While the exact structure of these phenolic condensation products is uncertain, the Y groups linking the phenolic nuclei all fall into the preferred subgenus 1. For method of preparation, see e.g., U.S. Pat. No. 3,124,555, U.S. Pat. No. 3,242,135, and British Pat. No. 961,504.

When the stabilizer composition is used in conjunction with a polyvalent metal salt of an organic acid, the organic acid will ordinarily have from about six to about twenty-four carbon atoms. The polyvalent metal can be any metal of Group II of the Periodic Table, such as zinc, calcium, cadmium, barium, magnesium and strontium. The alkali metal salts and heavy metal salts such as lead salts are unsatisfactory. The acid can be any organic non-nitrogenous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicylic acid, naphthoic acid, 1-naphthalene acetic acid, orthobenzoyl benzoic acid, naphthenic acids derived from petroleum, abietic acid, dihydroabietic acid, hexahydrobenzoic acid, and methyl furoic acid.

The water-insoluble salts are preferred, because they are not leached out when the plastic is in contact with water. Where these salts are not known, they are made by the usual types of reactions, such as by mixing the acid, or anhydride with the corresponding oxide or hydroxide of the metal in a liquid solvent, and heating, if necessary, until salt formation is complete.

A variety of organic triphosphites and acid phosphites can be employed, of which the following are exemplary.

The organic triphosphite can be any organic phosphite having three or more organic radicals attached to phosphorus through oxygen. The acid phosphite can be any organic phosphite having one or two organic radicals attached to phosphorus through oxygen. These radicals can be monovalent radicals, in the case of the triphosphites, diphosphites and monophisphites.

The organic triphosphites in which the radicals are monovalent can be defined by the formula:

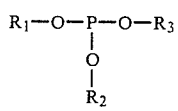

in which
$R_1$, $R_2$ and $R_3$ are selected from the group consisting of alkyl, alkenyl, aryl, alkaryl, aralkyl, and cycloalkyl groups having from one to about thirty carbon atoms.

The acid phosphites are defined by the same formula, but one or two of $R_1$, $R_2$ and $R_3$ is hydrogen or a cation of a metal or ammonium.

Also included are the organic triphosphites having a bivalent organic radical forming a heterocyclic ring with the phosphorus of the type:

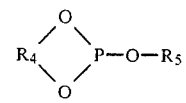

in which
$R_4$ is a bivalent organic radical selected from the group consisting of alkylene, arylene, aralkylene, alkarylene and cycloalkylene radicals having from two to about thirty carbon atoms, and $R_5$ is a monovalent organic radical as defined above in the case of $R_1$, $R_2$ and $R_3$;

$R_5$ is hydrogen or a cation, in the case of the acid phosphites.

Also useful organic triphosphites are mixed heterocyclic-open chain phosphites of the type:

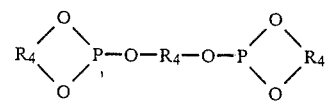

More complex triphosphites are formed from trivalent organic radicals, of the type:

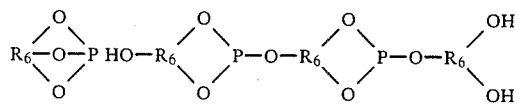

in which
$R_6$ is a trivalent organic radical of any of the types of $R_1$ to $R_5$, inclusive, as defined above.

A particularly useful class of complex triphosphites are the tetraoxadiphosphaspiro undecanes of the formula:

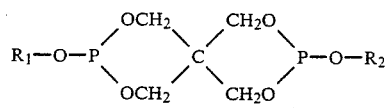

where
$R_1$ and $R_2$ are selected from the group consisting of aryl, alkyl, aryloxyethyl, alkyloxyethyl, aryloxyethoxyethyl, alkyloxyethoxyethyl and alkyloxypolyethoxyethyl having from about 1 to about 30 carbon atoms.

In the case of the acid phosphites, one or both of $R_1$ and $R_2$ is also hydrogen or a cation.

An especially preferred class of organic triphosphites and acid phosphites have a bicyclic aromatic group attached to phosphorus through oxygen, with no or one or more phenolic hydroxyl groups on either or both of the aromatic rings. These phosphites are characterized by the formula;

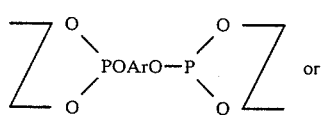 or

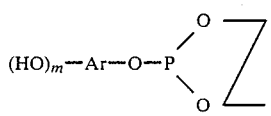

in which

Ar is a mono or bicyclic aromatic nucleus and m is an integer of from 0 to about 5. Z is one or a plurality of organic radicals as defined above for $R_1$ to $R_6$, taken singly or together in sufficient number to satisfy the valences of the two phosphite oxygen atoms.

One or both Z radicals is also hydrogen, in the case of the acid phosphites, and can include additional bicyclic aromatic groups of the type $(HO)_m$—Ar.

The cation in the case of acid phosphites can be a metal, such as an alkali metal, for instance, sodium, potassium or lithium; an alkaline earth metal, for instance, barium, calcium, or a nontoxic polyvalent metal, such as magnesium, tin and zinc.

Usually, the triphosphites and acid phosphites will not have more than about sixty carbon atoms.

Exemplary triphosphites are monophenyl di-2-ethylhexyl phosphite, diphenyl mono-2-ethylhexyl phosphite, di-isooctyl monotolyl phosphite, tri-2-ethylhexyl phosphite, phenyl dicyclohexyl phosphite, phenyl diethyl phosphite, triphenyl phosphite, tricresyl phosphite, tri(dimethylphenyl)phosphite, trioctadecyl phosphite, triisooctyl phosphite, tridodecyl phosphite, isooctyl diphenyl phosphite, diisooctyl phenyl phosphite, tri(t-octylphenyl)phosphite, tri-(t-nonylphenyl)phosphite, benzyl methyl isopropyl phosphite, butyl dicresyl phosphite, isooctyl di(octylphenyl)phosphite, di(2-ethylhexyl)(isooctylphenyl) phosphite, tri(2-cyclohexylphenyl)phosphite), tri-α-naphthyl phosphite, tri(-phenylphenyl)phosphite, tri(2-phenylethyl)phosphite, ethylene phenyl phosphite, ethylene t-butyl phosphite, ethylene isohexyl phosphite, ethylene isooctyl phosphite, ethylene cyclohexyl phosphite, 2-phenoxy-1,3,2-dioxaphosphorinane, 2-butoxy-1,3,2-dioxyphosphorinane, 2-octoxy-5,5-dimethyl-dioxaphosphorinane, and 2-cyclohexyloxy-5,5-diethyl dioxaphosphorinane.

Exemplary pentaerythritol triphosphites are 3,9-diphenoxy-2,4,8,10-tetraoxa-3,9-diphosphaspiro-(5,5)-undecane(diphenyl-pentaerythritol diphosphite), 3,9-di(decyloxy)-2,4,8, 10-tetraoxa-3,9-diphosphaspiro(5,5)-undecane, 3,9-di(isodecyloxy)-2,4,8,10-tetraoxa-3,9-diphosphaspiro-(5,5)-undecane, 3,9-di(octadecyloxy)-2,4,8,10-tetraoxa-3,9-diphosphaspiro-(5,5)-undecane, 3-phenoxy-9-isodecyloxy-2,4,8,10-tetraoxa-3,9-diphosphaspiro-(5,5)-undecane, 3,9-di(methoxy)-2,4,8,10-tetraoxa-3,9-diphosphaspiro-(5,5)-undecane, 3,9-di(-lauryloxy)-2,4,8,10-tetraoxa-3,9-diphosphaspiro-(5,5)-undecane, 3,9-di-p-tolyloxy-2,4,8,10-tetraoxa-3,9-diphosphaspiro-(5,5)-undecane, 3,9-di(methoxyethyloxy)-2,4,8,10-tetraoxa-3,9-diphosphaspiro-(5,5)-undecane, 3-methoxyethyloxy-9-isodecyloxy-2,4,8,10-tetraoxa-3,9-diphosphaspiro-(5,5)-undecane, 3,9-di(ethoxyethyloxy)-2,4,8,10-tetraoxa-3,9-diphosphaspiro-(5,5)-undecane, 3,9-di(butoxyethyloxy)-2,4,8,10-tetraoxa-3,9-diphosphaspiro-(5,5)-undecane, 3-methoxyethyloxy-9-butoxy-ethyloxy-2,4,8,10-tetraoxa-3,9-diphosphaspiro-(5,5)-undecane, 3,9-di(methoxyethoxyethyloxy)-2,4,8,10-tetraoxa-3,9-diphosphaspiro-(5,5)-undecane, 3,9-di-(butoxyethoxyethyloxy)-2,4,8,10-tetraoxa-3,9-diphosphaspiro-(5,5)-undecane, 3,9-di(methoxyethoxyethoxyethyloxy)-2,4,8,10-tetraoxa-3,9-diphosphaspiro-(5,5)-undecane, 3,9-di(methoxy (polyethoxy)ethyloxy)-2,4,8,10-tetraoxa-3,9-diphosphaspiro-(5,5)-undecane where the (polyethoxy) ethyloxy group has an average molecular weight of 350), 3,9-di(methoxy(polyethoxy) ethyloxy)-2,4,8,10-tetraoxa-3,9-diphosphaspiro-(5,5)-undecane (where the (polyethoxy) ethyloxy group has an average molecular weight of 550).

Exemplary of the bis aryl triphosphites are: bis(4,4′-thio-bis(2-tertiary-butyl-5-methyl-phenol))isooctyl phosphite, mono(4,4′-thio-bis(2-tertiary-butyl-5-methyl-phenol))di-phenyl phosphite, tri-(4,4′-n-butylidene-bis(2-tertiary-butyl-5-methylphenol))phosphite, (4,4′-benzylidene-bis(2-tertiary-butyl-5-methyl-phenol)-)diphenyl phosphite, isooctyl 2,2′-bis(-parahydroxyphenyl)propane phosphite, decyl 4,4′-n-butylidene-bis(2-tertiary-butyl-5-methylphenol)phosphite, tri-4,4′-thio-bis(2-tertiary-butyl-5-methylphenol)phosphite, 2-ethylhexyl-2,2′-methylene-bis(4-methyl-6,1′-methylcyclohexyl)phenol phosphite, tri(2,2′-bis-(para-hydroxyphenyl)propane)phosphite, tri(4,4′-thio-bis(2-tertiary-butyl-5-methyl-phenol)phosphite, isooctyl(2,6-bis(2′-hydroxy-3,5-dinonylbenzyl)-4-nonyl phenyl))phosphite, tetra-tridecyl-4,4′-n-butylidene-bis(2-tertiary-butyl-5-methylphenyl)diphosphite, tetra-isooctyl-4,4′-thio-bis(2-tertiary-butyl-5-methylphenyl)diphosphite, 2,2′-methylenebis(4-methyl-6,1′-methyl cyclohexyl phenyl)-polyphosphite, isooctyl-4,4′-isopropylidene-bis-phenyl polyphosphite, 2-ethylhexyl-2,2′-methylene-bis(4-methyl-6,1′-methyl-cyclohexyl)phenyl triphosphite, tetra-tridecyl-4,4′-oxydiphenyl diphosphite, tetra-n-dodecyl-4,4′-n-butylidene bis(2-tertiarybutyl-5-methylphenyl)diphosphite, tetra-tridecyl-4,4′-isopropylidene bisphenyl diphosphite, hexa-tridecyl butane-1,1,3-tris(2′-methyl-5′-tertiary-butylphenyl-4′)triphosphite.

Exemplary acid phosphites are di(phenyl)phosphite, monophenyl phosphite, mono(diphenyl)phosphite, dicresyl phosphite, di-(o-isooctylphenyl)phosphite, di(p-ethylhexylphenyl)phosphite, di(p-t-octylphenyl)-phosphite, di(dimethylphenyl)phosphite, di-n-butyl phosphite, di-2-ethylhexyl phosphite, mono-2-ethylhexylphosphite, diisooctyl phosphite, monoisooctyl phosphite, monododecyl phosphite, 2-ethylhexyl phenyl phosphite, 2-ethylhexyl-(n-octylphenyl)phosphite, monocyclohexyl phosphite, dicyclohexyl phosphite, di(2-cyclohexyl phenyl)phosphite, di-α-naphthyl phosphite, diphenyl phenyl phosphite, di(diphenyl)phosphite, di-(2-phenyl ethyl)phosphite, dibenzyl phosphite, monobenzyl phosphite, n-butyl cresyl phosphite and didodecyl phosphite, cresyl phosphite, t-octylphenyl phosphite, ethylene phosphite, butyl cresyl phosphite, isooctyl monotolyl phosphite and phenyl cyclohexyl phosphite.

Exemplary of the bis aryl acid phosphites are: bis(4,4′-thio-bis(2-tertiary-butyl-5-methylphenol))-phosphite, (4,4′-thio-bis(2-tertiary-butyl-5-methylphenol))phenyl phosphite, bis(4,4′-n-butylidene-bis(2-tertiary-butyl-5-methylphenol))phosphite, mono(4,4′-benzylidene-bis(2-tertiary-butyl-5-methylphenol))-phosphite, mono(2,2′-bis-(parahydroxyphenyl)propane) phosphite, mono(4,4′-butylidene-bis(2-tertiary-butyl-5-methylphenol)phosphite, bis(4,4′-thio-bis(2-tertiary-butyl-5-methylphenol))phosphite, mono-2-ethylhexyl-mono-2,2′-methylene-bis(4-methyl-6,1′-methylcyclohexyl)phenol phosphite, bis(2,2′-bis(para-hydroxyphenyl)propane)phosphite, monoisooctylmono(4,4′-thio-bis(2-tertiary-butyl-5-methylphenol))phosphite, isooctyl-(2,6-bis(2′-hydroxy-3,5-dinonylbenzyl)-4- nonylphenyl))phosphite, tri-tridecyl-4,4'-n-butylidene-bis(2-tertiary-butyl-5-methylphenyl)diphosphite, triisooctyl-4,4'-thio-bis(2-tertiary-butyl-5-methylphenyl)-diphosphite, bis(2,2'-methylenebis(4-methyl-6,1'-methyl cyclohexyl phenyl))phosphite, isooctyl-4,4'-isopropylidene-bis-phenyl phosphite, monophenyl mono(2,2'-methylene-bis(4-methyl-6,1'-methyl-cyclohexyl))triphosphite, di-tridecyl-4,4'-oxydiphenyl diphosphite, di-n-dodecyl-4,4'-n-butylidene-bis(2-tertiary-butyl-5-methylphenyl)diphosphite, di-tridecyl-4,4'-isopropylidene bisphenyl diphosphite, tetra-tridecyl butane-1,1,3-tris(2'-methyl-5-tertiary-butylphenyl-4)-triphosphite.

The thiodipropionic acid ester has the following formula:

$$R_1OOCCH_2CH_2-S-CH_2CH_2COOY$$

in which $R_1$ is an organic radical selected from the group consisting of hydrocarbon radicals such as alkyl, alkenyl, aryl, cycloalkyl and mixed alkyl aryl and mixed alkyl cycloalkyl radicals; hydroxyalkyl and hydroxyalkyloxyalkylene radicals; and esters thereof with aliphatic carboxylic acids; and Y is selected from the group consisting of (a) hydrogen, (b) a second R radical $R_2$, which can be the same as or different from the $R_1$ radical, (c) a polymeric chain of n thiodipropionic acid ester units:

$$-XO[OCCH_2CH_2SCH_2CH_2COOXO]_nOCCH_2CH_2-S-CH_2CH_2COOZ$$

where Z is hydrogen, $R_2$ or M, n is the number of thiodipropionic acid ester units in the chain, and X is a bivalent hydrocarbon group of the type of $R_1$, that is, alkylene, alkenylene, cycloalkylene, mixed alkylenearylene and mixed alkylenecycloalkylene radicals; hydroxyalkylene and hydroxyalkyloxyalkylene radicals; and esters thereof with aliphatic carboxylic acids; the value of n can range upwards from 0, but there is no upper limit on n except as is governed by the ratio of carbon atoms to sulfur atoms as stated below; and (d) a polyvalent metal M of Group II of the periodic table such as zinc, calcium, cadmium, barium, magnesium and strontium.

The molecular weights of the R and Y radicals are taken such that with the remainder of the molecule the thiodipropionic ester has a total of from about ten to about sixty carbon atoms per sulfur atom.

Accordingly, the various thiodipropionic acid ester species coming within the above-designated categories within the general formula can be defined as follows:

(a) $R_1OOCCH_2CH_2SCH_2CH_2COOH$
(b) $R_1OOCCH_2CH_2SCH_2CH_2COOR_2$
(c) $R_1O[OCCH_2CH_2SCH_2CH_2COOX-O]_nOCCH_2CH_2SCH_2CH_2COOZ$
(d) $R_1OOCCH_2CH_2SCH_2CH_2COOM$

In the above formulae $R_1$ and $R_2$, M, X and Z are the same as before and the value of $n_1$ can range upwards from 1, but there is no upper limit on $n_1$ except as is imposed by the ratio of carbon atoms, as stated below. In the polymer (c), as in the other forms of thiodipropionic acid esters, the total number of carbon atoms per sulfur atom is within the range from about ten to about sixty.

The R radical of these esters is important in furnishing compatibility with the polymer. The Y radical is desirably a different radical, $R_2$ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described above.

The aryl, alkyl, alkenyl, and cycloalkyl groups may, if desired, contain inert, nonreactive substituents such as halogen and other carbocyclic and heterocyclic ring structures condensed therewith.

Typical R radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, naphthyl, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl-substituted alkylene radicals such as 1,2-propylene,

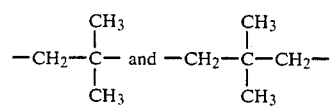

arylene radicals such as phenylene

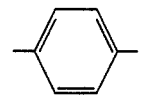

methylenephenylene

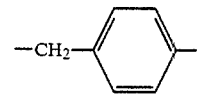

dimethylene phenylene

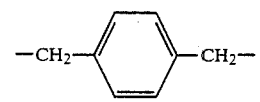

and alicyclylene such as cyclohexylene

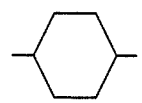

and cyclopentylene

As exemplary of the thiodipropionic acid esters which can be used, there can be mentioned the following: monolauryl thiodipropionic acid, dilauryl thiodipropionate, butyl stearyl thiodipropionate, 2-ethylhexyl lauryl thiodipropionate, di-2-ethylhexyl-thiodipropionate, diisodecyl thiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soyabean oil fatty alcohols and thiodipropionic acid, cyclohexyl nonyl thiodipropionate, monooleyl thiodipropionic acid, hydroxyethyl lauryl thiodipropionate, monoglyceryl thiodipropionic acid, glyceryl monostearate mono-thiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl)thiodipropionic acid.

These esters are for the most part known compounds, but where they are not available, they are readily prepared by esterification of thiodipropionic acid and the corresponding alcohol.

Also useful are:

(1) Thioalkanoic acid amides of Tokuno et al Japanese patent No. 16,286/68 having the formula:

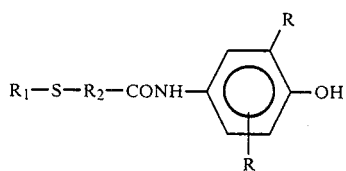

R is alkyl of one to eight carbon atoms, $R_1$ is alkyl of six to twenty-four carbon atoms, and $R_2$ is alkylene of one to six carbon atoms.

(2) Thioalkanoic acid amides of 1,3,5-triazines of Ozeki et al Japanese Pat. No. 20,366/68 having the formula:

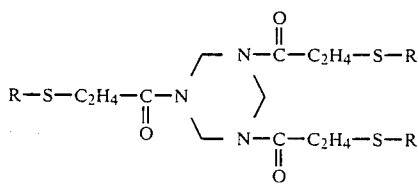

R is alkyl of eight to eighteen carbon atoms.

(3) Bis-thioalkanoic acid amides of Yamamoto et al Japanese Pat. No. 23,765/68 having the formula:

$$R-S-C_2H_4-\underset{\underset{O}{\|}}{C}-NH-NH-\underset{\underset{O}{\|}}{C}-C_2H_4-S-R$$

R is alkyl of more than six carbon atoms, aryl or aralkyl.

(4) Bis-thioalkylanoic acid amides of Ozeki et al Japanese Pat. No. 26,184/69 having the formula:

$$R-S-C_2H_4-\underset{\underset{O}{\|}}{C}-NH-NH-\underset{\underset{O}{\|}}{C}-R_1-\underset{\underset{O}{\|}}{C}-NH-NH-\underset{\underset{O}{\|}}{C}-C_2H_4-S-R$$

R is alkyl of twelve to eighteen carbon atoms, and $R_1$ is alkylene of one to ten carbon atoms, cycloalkylene, or arylene.

(5) Bis-alkylene thioalkanoic acid amides of Ozeki Japanese Pat. No. 31,464/69 having the formula:

$$R-S-C_2H_4-\underset{\underset{O}{\|}}{C}-NH-CH_2-NH-\underset{\underset{O}{\|}}{C}-C_2H_4-S-R$$

R is alkyl of more than six carbon atoms, aryl, or aralkyl.

(6) Thioalkanoic acid amide derivatives of Minagawa et al, published Japanese application No. 106,484/74 having the formula:

$$R-S-C_2H_4-\underset{\underset{O}{\|}}{C}-NH-NH-\underset{\underset{O}{\|}}{C}-\underset{\underset{O}{\|}}{C}-NH-NH-\underset{\underset{O}{\|}}{C}-C_2H_4-S-R$$

R is hydrocarbyl of one to twenty carbon atoms.

(7) Alkylene bis-thioalkanoic acid amides of U.S. Pat. No. 4,279,805 to Ohzeki et al, patented July 21, 1981, having the general formula:

$$R_1-S-R_2-\underset{\underset{O}{\|}}{C}-NH-R_3-NH-\underset{\underset{O}{\|}}{C}-R_2-S-R_1$$

wherein:
$R_1$ is alkyl having from one to about fifty carbon atoms;
$R_2$ is alkylene having from one to about three carbon atoms; and
$R_3$ is alkylene having from about two to about twelve carbon atoms.

β-Alkylthiopropionic acid esters having the general formula:

$$R-S-C_2H_4COOR(-R')_n$$

wherein:
R is alkyl of four to twenty carbon atoms;
n is a number from 1 to 6; and
R' is the residue of an alcohol having from one to six hydroxyl groups.

Pentaerythritol tetra dodecyl thio propionate is an example of this group.

Other conventional light stabilizers can be employed, such as hydroxybenzophenones such as 2-hydroxy-4-methoxybenzophenone, 2-hydroxy-4-n-octoxy benzophenone, 2,4-dihydroxybenzophenone, benzotriazoles, such as 2(2-hydroxy-5-methylphenyl)benzotriazoles, 2(2-hydroxy-3-t-butyl-5-methylphenyl)-5-chlorobenzotriazole, 2(2-hydroxy-3-5-di-t-butylphenyl)5-chlorobenzotriazole, 2(2-hydroxy-3,5-di-t-amylphenyl)benzotriazole, benzoates such as phenylsalicylate, 2,4-di-t-butylphenyl-3,5-di-t-butyl-4-hydroxy phenylbenzoate, nickel compounds such as nickel-2,2'-thiobis(4-t-octylphenolate), nickel-monoethyl(3,5-di-t-butyl-4-hydroxybenzyl)phosphonate, substituted acrylonitriles such as methyl-α-cyano-β-methyl-β-(p-methoxyphenyl)acrylate and oxalic anilides such as N-2-ethyl phenyl-N'-2-ethoxy-5-t-butyl phenyl oxalic diamide, N-2-ethyl phenyl-N'-2-ethoxy phenyl oxalic diamide.

A sufficient amount of the stabilizer or combination is used to improve the resistance of the synthetic polymer to deterioration in physical properties when exposed to heat and light, including, for example, discoloration, reduction in melt viscosity and embrittlement. Very small amounts are usually adequate. Amounts within the range from about 0.001 to about 10% total stabilizers including the polymeric light stabilizer of the invention by weight of the polymer are satisfactory. Preferably, from 0.01 to 5% is employed for optimum stabilization.

Inasmuch as all components are solids, the stabilizer systems of the invention are readily rendered in solid particulate form, comprising a blend of:
(a) polymeric light stabilizer in an amount of from about 10 to about 35 parts by weight; and optionally:
(b) a phenolic antioxidant in an amount from about 10 to about 35 parts by weight; and/or
(c) other heat or light stabilizers in an amount of from about 10 to about 35 parts by weight.

The polymeric light stabilizer of the invention can be employed in combination with phenolic antioxidant and/or other conventional heat and light stabilizers for the particular synthetic polymer.

Thus, for example, in the case of polyvinyl chloride resins, other polyvinyl chloride resin heat stabilizers can be included, including polyvalent metal fatty acid salts such as barium and cadmium salts of the higher fatty acids; organotin compounds; and epoxy compounds.

With polyolefin resins there can be employed fatty acid salts of polyvalent metals, and the higher fatty acid esters of thiodipropionic acids, such as, for example, dilauryl thiodipropionate.

With polyamide resin compositions, polyamide stabilizers such as copper salts in combination with iodides and/or other phosphorus compounds and salts of divalent manganese can be used.

With synthetic rubbers and acrylonitrile-butadiene-sytrene terpolymers, other antioxidants and polyvalent metal salts of the higher fatty acids can be used.

In addition, other conventional additives for synthetic polymers, such as plasticizers, lubricants, emulsifiers, antistatic agents, flame-proofing agents, pigments and fillers, can be employed.

The stabilizer or combination is incorporated in the polymer in suitable mixing equipment, such as a mill or a Banbury mixer. If the polymer has a melt viscosity which is too high for the desired use, the polymer can be worked until its melt viscosity has been reduced to the desired range before addition of the stabilizer. Mixing is continued until the mixture is substantially uniform. The resulting composition is then removed from the mixing equipment and brought to the size and shape desired for marketing or use.

The stabilized polymer can be worked into the desired shape, such as by milling, calendering, extruding or injection molding or fiber-forming. In such operations, it will be found to have a considerably improved resistance to reduction in melt viscosity during the heating, as well as a better resistance to discoloration and embrittlement on ageing and heating.

The following Examples represent preferred embodiments of synthetic resin compositions in accordance with the invention.

EXAMPLES 1 TO 6

A group of polyvinyl chloride resin compositions was prepared having the following formulation:

| Ingredient | Parts by Weight |
|---|---|
| Polyvinyl chloride | 100 |
| Dioctylphthalate | 48 |
| Epoxidized soybean oil | 2 |
| Tris(nonyl phenyl)phosphite | 0.2 |
| Ca stearate | 1.0 |
| Zn stearate | 0.1 |
| Stabilizer as shown in Table I | 0.3 |

This formulation was blended and sheeted off on a two-roll mill to form sheets 1 mm thick. The light resistance of these sheets was then determined by placing strips 1 cm wide in a Weather-O-Meter, and exposing them to ultraviolet light. The time in hours was then noted for the sheets to develop a noticeable discoloration and/or embrittlement, indicating deterioration due to oxidation in the presence of ultraviolet light.

The following results were obtained:

TABLE II

| Control No. | Stabilizer | Hours to failure |
|---|---|---|
| 1 | None | 180 |
| 2 | 1,2,2,6,6-Pentamethyl-4-piperidyl methacrylate polymer (M.W. 12000) | 570 |
| 3 | Bis(1,2,2,6,6-pentamethyl-4-piperidyl) fumarate | 320 |

| Example No. | Copolymer of | Hours to failure |
|---|---|---|
| 1 | <br>Vinyl acetate | 870 |
| 2 | <br>Tricyclo (5.2.1.0²·⁶) decene-3 | 820 |
| 3 | 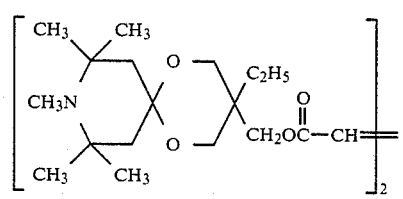 | 850 |

TABLE II-continued

| | | |
|---|---|---|
| | Octyl vinyl ether | |
| 4 | [structure: bis(2,2,6,6-tetramethyl-1-(1,1-dimethyl)dioxolane-piperidyl) with NC₂H₄OCCH= linkage]₂ Vinyl acetate | 840 |
| 5 | [structure: bis(2,2,6,6-tetramethyl-dioxa-piperidyl) with N—C₂H₄OCCH= linkage]₂ Butyl vinyl ether | 790 |
| 6 | CH₃—N(2,2,6,6-tetramethylpiperidyl)—OCCH=CHCO—(2,2,6,6-tetramethylpiperidyl)N—CH₃ | 840 |
| | α-Pinene | |

The improvement when using the copolymer light stabilizers of the invention as compared to the Controls is evident from the above data.

EXAMPLES 7 TO 14

Polypropylene compositions were prepared using stabilizers of the invention and two of the prior art, and having the following formulation:

| Ingredient | Parts by Weight |
|---|---|
| Polypropylene | 100 |
| Stearyl β-3,5-di-t-butyl-4-hydroxyphenyl propionate | 0.2 |
| Stabilizer as shown in Table III | 0.3 |

The compositions were thoroughly blended in a Brabender Plastograph, and then compression-molded to form sheets 0.3 mm thick. Pieces 2.5 cm² were cut off from the sheets and exposed to a high voltage mercury lamp and with and without immersion in hot water at 80° C. for fifteen hours. The hours to failure were noted and the results are shown in Table III.

TABLE III

| | | | Hours to Failure | |
|---|---|---|---|---|
| Control No. | Stabilizer | | Without Immersion | After Immersion for 15 hours |
| 1 | Bis(1,2,2,6,6-pentamethyl-4-piperidyl) fumarate | | 360 | 240 |
| 2 | Bis(1,2,2,6,6-pentamethyl-4-piperidyl) fumarate/ethylene copolymer (M. W. 2200) | | 650 | 540 |
| Example No. | Copolymer of | | | |
| 7 | CH₃N(2,2,6,6-tetramethylpiperidyl)—OCCH=CHCO—(2,2,6,6-tetramethylpiperidyl)NCH₃ | Vinyl acetate | 860 | 790 |
| 8 | CH₃N(2,2,6,6-tetramethylpiperidyl)—OCCH=CHCO—(2,2,6,6-tetramethylpiperidyl)NCH₃ | Butyl vinyl ether | 880 | 800 |
| 9 | CH₃N(2,2,6,6-tetramethylpiperidyl)—OCCH=CHCO—(2,2,6,6-tetramethylpiperidyl)NCH₃ | Tricyclo (5.2.1.0²·⁶) decene-3 | 910 | 830 |
| 10 | HN(2,2,6,6-tetramethylpiperidyl)—OCCH=CHCO—(2,2,6,6-tetramethylpiperidyl)NH | Triallyl isocyanurate | 790 | 730 |

TABLE III-continued

| No. | Structure | Comonomer | | |
|---|---|---|---|---|
| 11 | (2,2,6,6-tetramethyl-4-piperidylamine)-OCCH=CHCO-(2,2,6,6-tetramethyl-4-piperidylamine) maleate diester | Butyl vinyl ether | 840 | 760 |
| 12 | [1-methyl-2,2,6,6-tetramethyl-4-piperidyl spiroketal with 2-ethyl-2-(acryloyloxymethyl)-1,3-dioxy]₂ | dicyclopentadiene | 830 | 750 |
| 13 | [2,2,6,6-tetramethyl-4-piperidyl spiroketal-N-C₂H₄OCCH=]₂ | dicyclopentadiene | 810 | 750 |
| 14 | [2,2,6,6-tetramethyl-4-piperidyl spiroketal N—C₂H₄OCCH=]₂ | Vinyl acetate | 840 | 770 |

The improvement when using the copolymer light stabilizers of the invention as compared to the Controls is evident from the above data.

EXAMPLES 15 TO 21

Ethylene-vinyl acetate copolymer compositions were prepared using stabilizers of the invention and two of the prior art, and having the following formulation:

| Ingredient | Parts by weight |
|---|---|
| Ethylene vinyl acetate copolymer | 100 |
| 2,6-di-t-butyl-p-cresol | 0.1 |
| Ca stearate | 0.1 |
| Zn stearate | 0.1 |
| Diisodecylphenyl phosphite | 0.2 |
| Stabilizer as shown in Table IV | 0.2 |

The stabilizer was blended with the polymer on a two-roll mill at 130° C. and sheets 0.4 mm thick were then compression-molded at 140° C. from the resulting blend. Pieces 2.5 cm square were cut off from the sheets and exposed to ultraviolet light in a Weather-O-Meter for 500 hours. At the start and at the conclusion of the test, tensile strength of the sheet samples was determined. The results are shown in Table IV as percent retention of the initially determined tensile strength:

TABLE IV

| Control No. | Stabilizer | % Retention of Tensile Strength After 500 hours |
|---|---|---|
| 1 | Bis(2,2,6,6-tetramethyl-4-piperidyl)maleate | 63 |
| 2 | 1,2,2,6,6-Pentamethyl-4-piperidyl acrylate polymer (M.W. 8500) | 70 |

| Example No. | Copolymer of | | |
|---|---|---|---|
| 15 | [1-methyl-2,2,6,6-tetramethyl-4-piperidyl spiroketal with 2-ethyl-2-(acryloyloxymethyl)-1,3-dioxy]₂ | Vinyl acetate | 77 |

TABLE IV-continued

| # | Structure | Comonomer | Hours |
|---|-----------|-----------|-------|
| 16 | (CH₃)₂C–CH₂–C(CH₃)₂ ring with CH₃N, bearing –OCCH=CHCO– linker to another such ring with NCH₃ | Butyl vinyl ether | 81 |
| 17 | Same piperidine-type bis structure with CH₃N groups, –OCCH=CHCO– linker | Vinyl propionate | 83 |
| 18 | Same bis structure with HN and NH groups, –OCCH=CHCO– linker | Butyl vinyl ether | 82 |
| 19 | [CH₃N-substituted spiro dioxane with –CH₂OCCH= ]₂ | Vinyl acetate | 79 |
| 20 | [tetraethyl-substituted piperidine N–C₂H₄OCCH= ]₂ | Vinyl acetate | 76 |
| 21 | [spiro dioxane bearing NC₂H₄OCCH= ]₂ | Vinyl acetate | 83 |

The improvement when using the copolymer light stabilizers of the invention as compared to the Controls is evident from the above data.

EXAMPLES 22 TO 29

High density polyethylene compositions were prepared using the stabilizers of the invention and two of the prior art, and having the following formulation:

| Ingredient | Parts by Weight |
|---|---|
| High-density polyethylene | 100 |
| Ca stearate | 1 |
| Tetrakis-(methylene-3-(3,5-di-t-butyl-4-hydroxyphenyl)propionate)methane | 0.1 |
| Distearylthiodipropionate | 0.3 |
| Stabilizer as shown in Table V | 0.2 |

The stabilizer was blended with the polymer on a two-roll mill and sheets 0.5 mm thick were prepared by compression-molding of the blend. Pieces 2.5 cm square were cut off from the sheets, and exposed in a Weather-O-Meter to ultraviolet light. The time in hours when degradation set in, as determined by a significant discoloration and/or embrittlement, was noted as hours to failure, and the results are reported in Table V:

TABLE V

| Control | Hours to |

TABLE V-continued

| No. | Stabilizer | Failure |
|-----|------------|---------|
| 1 | Bis(1,2,2,6,6-pentamethyl-4-piperidyl) fumarate/ethylene copolymer (M.W. 2200) | 950 |
| 2 | 1-Acryloyloxyethyl-2,3,6-trimethyl-2,6-diethyl piperidine polymer (M.W. 4000) | 730 |

| Example No. | Copolymer of | | Failure |
|-------------|--------------|---|---------|
| 22 | [structure: bis(1,2,2,6,6-pentamethyl-4-piperidyl) fumarate] | Vinyl acetate | 1290 |
| 23 | [structure: bis(1,2,2,6,6-pentamethyl-4-piperidyl) fumarate] | Butyl vinyl ether | 1260 |
| 24 | [structure: bis(1,2,2,6,6-pentamethyl-4-piperidyl) fumarate] | Tricyclo (5.2.1.0$^{2.6}$) decene-3 | 1280 |
| 25 | [structure with CH$_3$N-piperidyl, C$_2$H$_5$, CH$_2$OC(O)—CH=] | Octyl vinyl ether | 1250 |
| 26 | [structure with CH$_3$N-piperidyl, CH$_2$OCCH$_2$=] | Butyl vinyl ether | 1250 |
| 27 | [structure with 2,6-diethyl-2,6-dimethyl piperidinyl N—C$_2$H$_4$OCCH=] | Vinyl acetate | 1130 |
| 28 | [structure with piperidyl NC$_2$H$_4$OCCH=] | [tricyclodecene structure] | 1210 |

TABLE V-continued

| 29 | [structure: bis(1,2,2,6,6-pentamethyl-4-piperidyl) maleate-type with OCCH=CHCO linker] | α-Pinene | 1240 |

The improvement when using the copolymer light stabilizers of the invention as compared to the Controls is evident from the above data.

EXAMPLES 30 TO 36

Acrylonitrile-butadiene-styrene terpolymer resin compositions were prepared using stabilizers of the invention and two of the prior art, and having the following formulations:

| Ingredient | Parts by Weight |
|---|---|
| Acrylonitrile-butadiene-styrene terpolymer | 100 |
| 4,4'-Butylidene-bis(2-t-buyyl-m-cresol) | 0.1 |
| Stabilizer as shown in Table VI | 0.3 |

The stabilizer was blended with the resin on a two-roll mill, and sheets 3 mm thick were prepared by compression molding of the resulting blend. Pieces 2.5 cm square were cut off from the sheets, and subjected to ultraviolet light in a Weather-O-Meter for 800 hours. Tensile strength before and after the test exposure was determined, and the results reported as the percent of tensile strength retained, at the end of this time, in Table VI.

TABLE VI

| Control No. | Stabilizer | | % Tensile Strength Retained |
|---|---|---|---|
| 1 | Bis(1,2,2,6,6-pentamethyl-4-piperidyl) maleate | | 58 |
| 2 | 1,2,2,6,6-Pentamethyl-4-piperidyl acrylate polymer (M.W. 8500) | | 66 |

| Example No | Copolymer of | | % Tensile Strength Retained |
|---|---|---|---|
| 30 | [structure with CH₃N-piperidyl spiro ketal, C₂H₅, CH₂OC(=O)-CH= ]₂ | Vinyl acetate | 83 |
| 31 | [bis-piperidyl maleate structure] | Tricyclo (5.2.1.0$^{2,6}$) decene-3 | 85 |
| 32 | [bis-piperidyl maleate structure] | Vinyl propionate | 86 |
| 33 | [structure with CH₃N-piperidyl spiro ketal, C₂H₅, CH₂OC(=O)-CH= ]₂ | [dicyclopentadiene structure] | 84 |

TABLE VI-continued

| | | | |
|---|---|---|---|
| 34 | 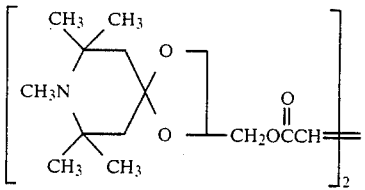 | Butyl vinyl ether | 82 |
| 35 | 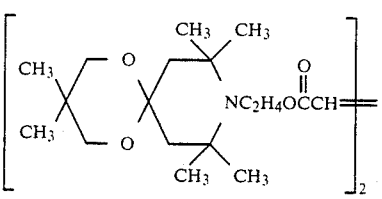 | Vinyl acetate | 84 |
| 36 | 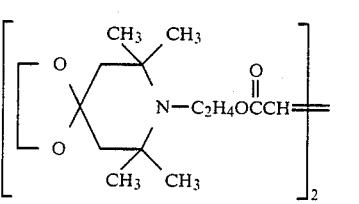 | Butyl vinyl ether | 83 |

The improvement when using the copolymer light stabilizers of the invention as compared to the Controls is evident from the above data.

EXAMPLES 37 TO 43

Conventional heat stabilizers for polymeric materials may lose their effectiveness because of volatilization or decomposition at high polymer processing temperatures. This is not true of the stabilizers of the invention, as shown by observing the effect of heat in repeated extrusions of ethylene-propylene copolymer compositions. These compositions were prepared using stabilizers of the invention and of the prior art, and having the following formulation:

| Ingredient | Parts by Weight |
|---|---|
| Ethylene-propylene copolymer | 100 |
| Ca stearate | 0.2 |
| Stearyl-(3,5-di-t-butyl-4-hydroxyphenyl) propionate | 0.1 |
| Dilauryl thiodipropionate | 0.2 |
| Stabilizer as shown in Table VII | 0.2 |

The ingredients were mixed and the compositions then extruded (cylinder temperature 230° C. and 240° C., head die temperature 250° C., velocity 20 rpm) five times. Test pieces were then molded by injection molding at 250° C. The test pieces were exposed to a high voltage mercury lamp, and the hours to failure noted as shown in Table VII.

TABLE VII

| Control No. | Stabilizer | | Hours to Failure Extruded 1 time | Extruded 5 times |
|---|---|---|---|---|
| 1 | Bis(1,2,2,6,6-pentamethyl-4-piperidyl) maleate | | 380 | 210 |
| 2 | Bis(1,2,2,6,6-pentamethyl-4-piperidyl) fumarate/ethylene copolymer (M.W. 2500) | | 530 | 370 |
| Example No. | Copolymer of | | | |
| 37 | 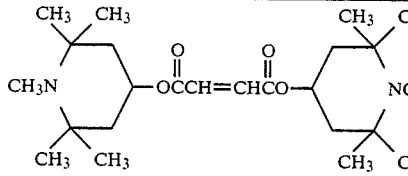 | Vinyl acetate | 670 | 600 |
| 38 | 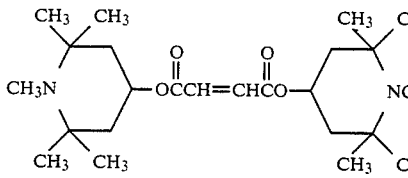 | Buty vinyl ether | 680 | 600 |

TABLE VII-continued

| | | | | |
|---|---|---|---|---|
| 39 | [structure: bis(1,2,2,6,6-pentamethyl-4-piperidyl) fumarate-type with CH₃N groups and -OCCH=CHCO- linker] | Vinyl propionate | 650 | 570 |
| 40 | [structure: piperidyl with C₂H₅, CH₂OC-CH= group, bracketed ₂] | [dicyclopentadiene structure] | 640 | 570 |
| 41 | [structure: piperidyl -CH₂OCCH= group, bracketed ₂] | Vinyl acetate | 620 | 560 |
| 42 | [structure: piperidyl with NC₂H₄OCCH= group, bracketed ₂] | [dicyclopentadiene structure] | 620 | 540 |
| 43 | [structure: piperidyl with N—C₂H₄OCCH= group, bracketed ₂] | Vinyl acetate | 630 | 530 |

The improvement when using the copolymer light stabilizers of the invention as compared to the Controls is evident from the above data.

EXAMPLES 44 TO 50

Polyurethane resin compositions were prepared using stabilizers of the invention and having the following formulation:

| Ingredient | Parts by Weight |
|---|---|
| Polyurethane resin (Asahi Denka U-100)[1] | 100 |
| Ca stearate | 0.7 |
| ZN stearate | 0.3 |
| 2,6-di-t-butyl-p-cresol | 0.1 |
| Stabilizer as shown in Table VIII | 0.3 |

[1] A polyurethane-isocyanurate made from toluene diisocyanate and alkylene polyol.

The stabilizer was blended with the finely powdered polyurethane resin on a two-roll mill for five minutes at 70° C., and the sheet was then compression-molded at 120° C. for five minutes to form sheets 0.5 mm thick. Pieces 2.5 cm square were cut out from the sheets, and exposed to ultraviolet light in a Weather-O-Meter for thirty hours. Elongation before and after exposure was determined, and the percent elongation retained after the exposure is given in Table VIII.

TABLE VIII

| Control No. | Stabilizer | % Elongation Retention |
|---|---|---|
| 1 | Bis(1,2,2,6,6-pentamethyl-4-piperidyl) fumarate | 53 |
| 2 | 1,2,2,6,6-Pentamethyl-4-piperidyl acrylate polymer (M.W. 8500) | 59 |

| Example No. | Copolymer of | |
|---|---|---|

TABLE VIII-continued

| No. | Structure | Comonomer | Value |
|---|---|---|---|
| 44 | | Vinyl acetate | 75 |
| 45 | | Butyl vinyl ether | 77 |
| 46 | | Triallyl isocyanurate | 70 |
| 47 | | Vinyl propionate | 76 |
| 48 | | Octyl vinyl ether | 73 |
| 49 | | | 75 |
| 50 | | Butyl vinyl ether | 73 |

The improvement when using the copolymer light stabilizers of the invention as compared to the Controls is evident from the above data.

Having regard to the foregoing disclosure, the following is claimed as the inventive and patentable embodiments thereof:

1. Copolymer light stabilizers having at least one 2,2,6,6-tetraalkyl piperidyl group in the molecule and a molecular weight within the range from about 1000 to about 20,000 of a maleic or fumaric acid ester having the formula:

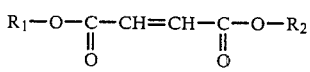

wherein:

$R_1$ is 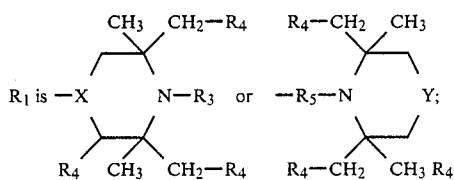

$R_2$ is alkyl having from one to about eighteen carbon atoms or $R_1$;

X is

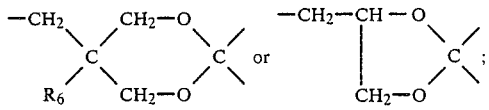

$R_6$ is lower alkyl or hydroxyalkyl having from one to about four carbon atoms;
$R_3$ is hydrogen, alkaryl having from seven to ten carbon atoms; or alkyl, hydroxyalkyl or epoxyalkyl having from one to about eighteen carbon atoms;
$R_4$ is hydrogen or methyl;
$R_5$ is alkylene having from two to about four carbon atoms;

Y is

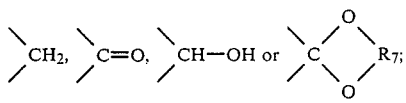

and $R_7$ is alkylene having from two to about eighteen carbon atoms with at least one monomer selected from the group consisting of aliphatic carboxylic acid vinyl esters having from two to about eight carbon atoms; alkyl vinyl ethers having from one to about eighteen carbon atoms; triallyl isocyanurate; pinene; and tricyclo(5.2.1.0$^{2.6}$)-decene-3.

2. Copolymer light stabilizers according to claim 1 in which the maleic and fumaric acid esters are esters of maleic or fumaric acid with a 2,2,6,6-tetraalkyl piperidyl alcohol represented by the formula:

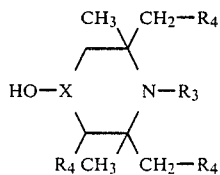

wherein:

X is selected from the group consisting of

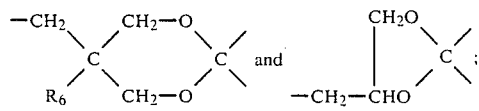

$R_6$ is lower alkyl or hydroxyalkyl having from one to about four carbon atoms;
$R_4$ is hydrogen or methyl;

$R_3$ is hydrogen; alkyl,hydroxyalkyl and epoxy alkyl having from one to about eighteen carbon atoms; or aralkyl having from seven to about ten carbon atoms:
Y is selected from the group consisting of >CH$_2$; >CHOH; >C=O; and

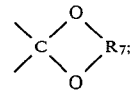

$R_7$ is alkylene having from two to about eighteen carbon atoms; and
$R_5$ is alkylene having from two to about four carbon atoms.

3. Copolymer light stabilizers according to claim 2 in which the monomer is an alkyl vinyl ether having from one to about eighteen carbon atoms.

4. A stabilizer composition for synthetic resins comprising:
(1) at least one copolymer light stabilizer in accordance with claim 1 and
(2) at least one phenolic antioxidant having at least one phenolic hydroxyl group, and at least one phenolic nucleus, and from about eight to about three hundred carbon atoms.

5. A polyvinyl chloride resin composition having improved resistance to deterioration comprising a polyvinyl chloride resin and a copolymer light stabilizer in accordance with claim 1.

6. A polyvinyl chloride resin composition in accordance with claim 5 in which the polyvinyl chloride resin is a copolymer of vinyl chloride and vinyl acetate.

7. An olefin polymer composition having improved resistance to deterioration comprising an olefin polymer selected from the group consisting of polymers of alpha olefins having from two to six carbon atoms and polystyrene, and a copolymer light stabilizer in accordance with claim 1.

8. An olefin polymer composition in accordance with claim 7 wherein the polyolefin is polypropylene.

9. An olefin polymer composition in accordance with claim 7 wherein the polyolefin is polyethylene.

10. A polyester polymer composition having improved resistance to deterioration comprising a polyester and a copolymer light stabilizer in accordance with claim 1.

11. A polyurethane resin composition having improved resistance to deterioration comprising a polyurethane resin and a copolymer light stabilizer in accordance with claim 1.

12. An ethylene-vinyl acetate copolymer composition having improved resistance to deterioration comprising an ethylene-vinyl acetate copolymer and a copolymer light stabilizer in accordance with claim 1.

13. An acrylonitrile-butadiene-styrene polymer having improved resistance to deterioration comprising an acrylonitrile-butadiene-styrene polymer and a copolymer light stabilizer in accordance with claim 1.

14. Copolymer light stabilizers having at least one 2,2,6,6-tetraalkyl piperidyl group in the molecule and a molecular weight within the range from about 1000 to about 20,000 of a maleic or fumaric acid ester containing a 2,2,6,6-tetraalkyl piperidyl group in the alcohol group of the ester with at least one monomer selected from the group consisting of triallyl isocyanurate;pinene;and tricyclo(5.2.1.0²·⁶)-decene-3.

15. Copolymer light stabilizers according to claim 14 which the maleic or fumaric acid ester has the formula:

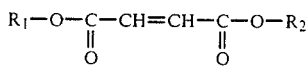

wherein:

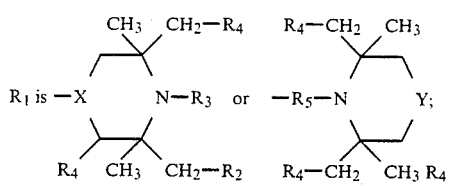

$R_2$ is alkyl having from one to about eighteen carbon atoms or $R_1$;

X is

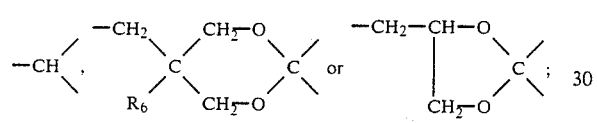

$R_6$ is lower alkyl or hydroxyalkyl having from one to about four carbon atoms;

$R_3$ is hydrogen, alkaryl having from seven to ten carbon atoms; or alkyl, hydroxyalkyl or epoxyalkyl having from one to about eighteen carbon atoms;

$R_4$ is hydrogen or methyl;

$R_5$ is alkylene having from two to about four carbon atoms;

Y is

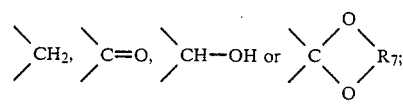

and $R_7$ is alkylene having from two to about eighteen carbon atoms.

16. Copolymer light stabilizers according to claim 15 in which the maleic and fumaric acid esters are esters of maleic or fumaric acid with a 2,2,6,6-tetraalkyl piperidyl alcohol represented by one of the formulae (I) and (II):

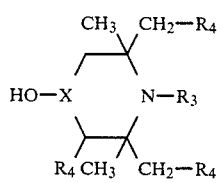

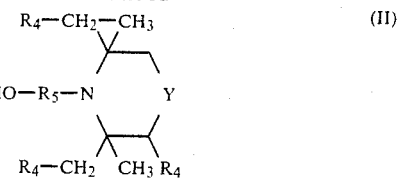

wherein

X is selected from the group consisting of

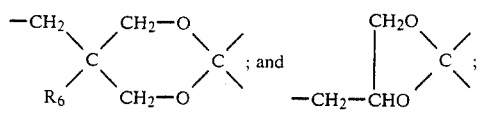

$R_6$ is lower alkyl or hydroxyalkyl having from one to about four carbon atoms;

$R_4$ is hydrogen or methyl;

$R_3$ is hydrogen; alkyl,hydroxyalkyl and epoxy alkyl having from one to about eighteen carbon atoms: or aralkyl having from seven to about ten carbon atoms;

Y is selected from the group consisting of $>CH_2$; $>CHOH$; $>C=O$; and

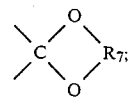

$R_7$ is alkylene having from two to about eighteen carbon atoms; and $R_5$ is alkylene having from two to about four carbon atoms.

17. Copolymer light stabilizers according to claim 16 which the monomer is an aliphatic carboxylic acid vinyl ester having from two to about eight carbon atoms.

18. Copolymer light stabilizers according to claim 16 in which the monomer is an alkyl vinyl ether having from one to about eighteen carbon atoms.

19. A stabilizer composition for synthetic resins comprising:
(1) at least one copolymer light stabilizer in accordance with claim 14 and
(2) at least one phenolic antioxidant having at least one phenolic hydroxyl group and at least one phenolic nucleus, and from about eight to about three hundred carbon atoms.

20. A polyvinyl chloride resin composition having improved resistance to deterioration comprising a polyvinyl chloride resin and a copolymer light stabilizer in accordance with claim 19.

21. An olefin polymer composition having improved resistance to deterioration comprising an olefin polymer selected from the group consisting of polymers of alpha-olefins having from two to six carbon atoms and polystyrene, and a copolymer light stabilizer in accordance with claim 14.

22. A polyester polymer composition having improved resistance to deterioration comprising a polyester and a copolymer light stabilizer in accordance with claim 14.

23. A polyurethane resin composition having improved resistance to deterioration comprising a polyurethane resin and a copolymer light stabilizer in accordance with claim 14.

24. An ethylene-vinyl acetate copolymer composition having improved resistance to deterioration comprising an ethylene-vinyl acetate copolymer and a copolymer light stabilizer in accordance with claim 14.

25. An acrylonitrile-butadiene-styrene polymer having improved resistance to deterioration comprising an acrylonitrile-butadiene-styrene polymer and a copolymer light stabilizer in accordance with claim 14.

26. Copolymer light stabilizers having at least one 2,2,6,6-tetraalkyl piperidyl group in the molecule and a molecular weight within the range from about 1000 to about 20,000 of a maleic or fumaric acid ester having the formula:

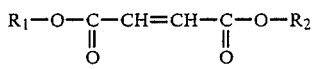

wherein:

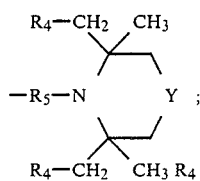

$R_2$ is alkyl having from one to about eighteen carbon atoms or $R_1$;

X is —CH<,

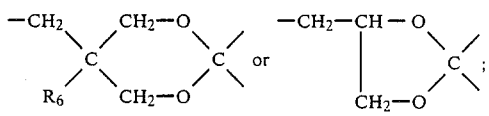

$R_6$ is lower alkyl or hydroxyalkyl having from one to about four carbon atoms;

$R_3$ is hydrogen, alkaryl having from seven to ten carbon atoms; or alkyl, hydroxyalkyl or epoxyalkyl having from one to about eighteen carbon atoms;

$R_4$ is hydrogen or methyl;

$R_5$ is alkylene having from two to about four carbon atoms;

Y is

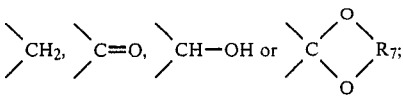

and $R_7$ is alkylene having from two to about eighteen carbon atoms;

with at least one monomer selected from the group consisting of aliphatic carboxylic acid vinyl esters having from two to about eight carbon atoms; alkyl vinyl ethers having from one to about eighteen carbon atoms; triallyl isocyanurate; pinene; and tricyclo(5.2.1.0$^{2.6}$)-decene-3.

27. Copolymer light stabilizers according to claim 26 in which the maleic and fumaric acid esters are esters of fumaric acid with the 2,2,6,6-tetraalkyl piperidyl alcohol.

28. Copolymer light stabilizers according to claim 26 in which the monomer is an aliphatic carboxylic acid vinyl ester having from two to about eight carbon atoms.

29. Copolymer light stabilizers according to claim 26 in which the monomer is an alkyl vinyl ether having from one to about eighteen carbon atoms.

30. A stabilizer composition for synthetic resins comprising:
  (1) at least one copolymer light stabilizer in accordance with claim 26 and
  (2) at least one phenolic antioxidant having at least one phenolic hydroxyl group, and at least one phenolic nucleus, and from about eight to about three hundred carbon atoms.

31. A polyvinyl chloride resin composition having improved resistance to deterioration comprising a polyvinyl chloride resin and a copolymer light stabilizer in accordance with claim 26.

32. An olefin polymer composition having improved resistance to deterioration comprising an olefin polymer selected from the group consisting of polymers of alpha-olefins having from two to six carbon atoms and polystyrene, and a copolymer light stabilizer in accordance with claim 26.

* * * * *